(12) United States Patent
Marugame

(10) Patent No.: US 9,092,851 B2
(45) Date of Patent: Jul. 28, 2015

(54) INFORMATION PROCESSING SYSTEM, INFORMATION PROCESSING METHOD, INFORMATION PROCESSING APPARATUS, CONTROL METHOD THEREFOR, AND STORAGE MEDIUM STORING CONTROL PROGRAM THEREFOR

(75) Inventor: Atsushi Marugame, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 13/982,415

(22) PCT Filed: Jan. 10, 2012

(86) PCT No.: PCT/JP2012/050248
§ 371 (c)(1),
(2), (4) Date: Jul. 29, 2013

(87) PCT Pub. No.: WO2012/105281
PCT Pub. Date: Aug. 9, 2012

(65) Prior Publication Data
US 2013/0315456 A1    Nov. 28, 2013

(30) Foreign Application Priority Data

Jan. 31, 2011  (JP) .................................. 2011-018936

(51) Int. Cl.
*G06K 9/00* (2006.01)
*G06K 9/68* (2006.01)
*G06T 7/00* (2006.01)
(52) U.S. Cl.
CPC ............. *G06T 7/0012* (2013.01); *G06T 7/0014* (2013.01); *G06T 2207/30024* (2013.01)

(58) Field of Classification Search
CPC ................ G06T 7/0012; G06T 7/0014; G06T 2207/30024
USPC .......................... 382/128–134, 209, 217–220
See application file for complete search history.

(56) References Cited

U.S. PATENT DOCUMENTS

| 5,807,256 A | 9/1998 | Taguchi et al. |
| 7,773,789 B2 | 8/2010 | Rousson et al. |
| 8,265,362 B2 | 9/2012 | Sano et al. |
| 8,831,361 B2 * | 9/2014 | Pintsov ......................... 382/224 |
| 2007/0014467 A1 * | 1/2007 | Bryll ............................. 382/152 |

(Continued)

FOREIGN PATENT DOCUMENTS

| JP | 06-251038 A | 9/1994 |
| JP | 07-271872 A | 10/1995 |
| JP | 2000-276587 A | 10/2000 |

(Continued)

*Primary Examiner* — Brian Le
(74) *Attorney, Agent, or Firm* — Sughrue Mion, PLLC

(57) ABSTRACT

This invention relates to an information processing apparatus which evaluates diagnosis based on the tissue sample image of a tissue. The information processing apparatus inputs a plurality of first regions selected as diagnosis targets from a tissue sample image obtained by capturing a tissue, a plurality of second regions selected as diagnosis targets from the tissue sample image, and pieces of position information of the respective regions selected on the tissue sample image. The information processing apparatus calculates a similarity between the plurality of first regions and the plurality of second regions based on correlations considering the distances between the selected regions on the tissue sample image. This arrangement can evaluate whether ROIs selected by a pathologist or apparatus include an important region of interest.

18 Claims, 24 Drawing Sheets

(56) References Cited

U.S. PATENT DOCUMENTS

| | | |
|---|---|---|
| 2007/0036415 A1 | 2/2007 | Takeo |
| 2010/0198072 A1* | 8/2010 | Abe et al. .................. 600/443 |
| 2010/0220915 A1* | 9/2010 | Sommer ..................... 382/131 |

FOREIGN PATENT DOCUMENTS

| | | |
|---|---|---|
| JP | 2007-061607 A | 3/2007 |
| JP | 2007-286945 A | 11/2007 |
| JP | 2009-175040 A | 8/2009 |

* cited by examiner

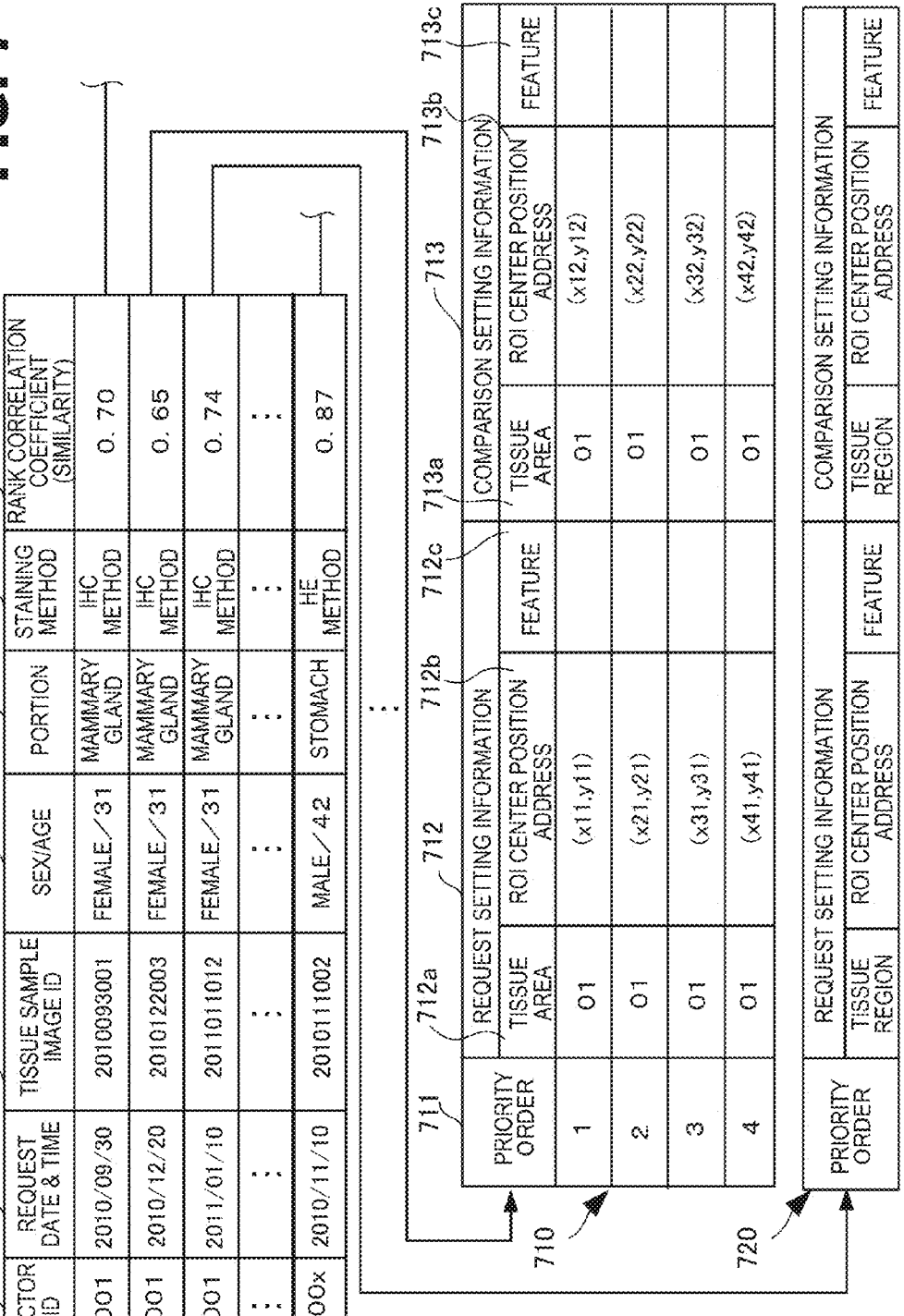

FIG. 15

| | 701 | 702 | 703 | 704 | 705 | 706 | 707 | 1209 |
|---|---|---|---|---|---|---|---|---|
| | DOCTOR ID | REQUEST DATE & TIME | TISSUE SAMPLE IMAGE ID | SEX/AGE | PORTION | STAINING METHOD | RANK CORRELATION COEFFICIENT (SIMILARITY) | SPECIALIST NAME |
| 1218 | 0001 | 2010/09/30 | 2010093001 | FEMALE/31 | MAMMARY GLAND | IHC METHOD | 0.70 | YYY |
| | 0001 | 2010/12/20 | 2010122003 | FEMALE/31 | MAMMARY GLAND | IHC METHOD | 0.65 | BBB |
| | 0001 | 2011/01/10 | 2011011012 | FEMALE/31 | MAMMARY GLAND | IHC METHOD | 0.74 | YYY |
| | ... | ... | ... | ... | ... | ... | ... | ... |
| | 000x | 2010/11/10 | 2010111002 | MALE/42 | STOMACH | HE METHOD | 0.87 | BBB |

710

| | 712 | 712a | 712b | 712c | 713 | 713a | 713b | 713c |
|---|---|---|---|---|---|---|---|---|
| | REQUEST SETTING INFORMATION | | | | COMPARISON SETTING INFORMATION | | | |
| 711 PRIORITY ORDER | | TISSUE AREA | ROI CENTER POSITION ADDRESS | FEATURE | | TISSUE AREA | ROI CENTER POSITION ADDRESS | FEATURE |
| 1 | | O1 | (x11,y11) | | | O1 | (x12,y12) | |
| 2 | | O1 | (x21,y21) | | | O1 | (x22,y22) | |
| 3 | | O1 | (x31,y31) | | | O1 | (x32,y32) | |
| 4 | | O1 | (x41,y41) | | | O1 | (x42,y42) | |

720

| | REQUEST SETTING INFORMATION | | | COMPARISON SETTING INFORMATION | | |
|---|---|---|---|---|---|---|
| PRIORITY ORDER | TISSUE AREA | ROI CENTER POSITION ADDRESS | FEATURE | TISSUE AREA | ROI CENTER POSITION ADDRESS | FEATURE | ically extracting regions of interest (ROIs) important for diagnosis and ordering them to assist diagnosis based on a tissue sample image serving as a pathological image.

CITATION LIST

Patent Literature

Patent literature 1: Japanese Patent Laid-Open No. 2009-175040

SUMMARY OF THE INVENTION

Technical Problem

However, the conventional technique does not refer to evaluation of the correctness of selection by comparing selection of an ROI by a pathologist with selection of an ROI by an apparatus for the same tissue sample image, or selection of an ROI by another pathologist for the same tissue sample image. It cannot be determined whether ROIs selected by the pathologist or apparatus include a region important for diagnosis.

The present invention enables to provide a technique of solving the above-described problem.

Solution to Problem

One aspect of the present invention provides an information processing apparatus comprising
an input unit that inputs a plurality of first regions selected as diagnosis targets from a tissue sample image obtained by capturing a tissue, a plurality of second regions selected as diagnosis targets from the tissue sample image, and pieces of position information of the respective regions selected on the tissue sample image, and
a calculator that calculates a similarity between the plurality of first regions and the plurality of second regions based on correlations considering distances between the selected regions on the tissue sample image.

INFORMATION PROCESSING SYSTEM, INFORMATION PROCESSING METHOD, INFORMATION PROCESSING APPARATUS, CONTROL METHOD THEREFOR, AND STORAGE MEDIUM STORING CONTROL PROGRAM THEREFOR

CROSS REFERENCE TO RELATED APPLICATIONS

This application is a National Stage of International Application No. PCT/JP2012/050248 filed Jan. 10, 2012, claiming priority based on Japanese Patent Application No. 2011-018936 filed Jan. 31, 2011, the contents of all of which are incorporated herein by reference in their entirety.

TECHNICAL FIELD

The present invention relates to an information processing technique for evaluating diagnosis based on the tissue sample image of a tissue.

BACKGROUND ART

In this technical field, patent literature 1 discloses a technique of automat-

Another aspect of the present invention provides a method for controlling an information processing apparatus, comprising
inputting a plurality of first regions selected as diagnosis targets from a tissue sample image obtained by capturing a tissue, a plurality of second regions selected as diagnosis targets from the tissue sample image, and pieces of position information of the respective regions selected on the tissue sample image, and
calculating a similarity between the plurality of first regions and the plurality of second regions based on correlations considering distances between the selected regions on the tissue sample image.

Still other aspect of the present invention provides a computer-readable storage medium storing a control program for causing a computer to execute
inputting a plurality of first regions selected as diagnosis targets from a tissue sample image obtained by capturing a tissue, a plurality of second regions selected as diagnosis targets from the tissue sample image, and pieces of position information of the respective regions selected on the tissue sample image, and
calculating a similarity between the plurality of first regions and the plurality of second regions based on correlations considering distances between the selected regions on the tissue sample image.

Still other aspect of the present invention provides an information processing apparatus comprising
a transmitter that selects a plurality of first regions as diagnosis targets from a tissue sample image obtained by capturing a tissue, and transmits the plurality of first regions,
a receiver that receives a similarity between the plurality of first regions and a plurality of second regions selected as diagnosis targets from the tissue sample image, and the plurality of second regions, the similarity being calculated, in response to the transmission of the plurality of first regions, based on distances between the selected regions that are weighted by features of the regions on the tissue sample image, and
a display that displays the similarity received by the receiver, and the plurality of first regions and the plurality of second regions which are represented to be distinguishable.

Still other aspect of the present invention provides a method for controlling an information processing apparatus, comprising
transmitting a plurality of first regions selected as diagnosis targets from a tissue sample image obtained by capturing a tissue,
receiving a similarity between the plurality of first regions and a plurality of second regions selected as diagnosis targets from the tissue sample image, and the plurality of second regions, the similarity being calculated, in response to the transmission of the plurality of first regions, based on distances between the selected regions that are weighted by features of the regions on the tissue sample image, and
displaying the similarity received in the receiving, and the plurality of first regions and the plurality of second regions which are represented to be distinguishable.

Still other aspect of the present invention provides a computer-readable storage medium storing a control program for causing a computer to execute
transmitting a plurality of first regions selected as diagnosis targets from a tissue sample image obtained by capturing a tissue,
receiving a similarity between the plurality of first regions and a plurality of second regions selected as diagnosis targets from the tissue sample image, and the plurality of second regions, the similarity being calculated, in response to the transmission of the plurality of first regions, based on distances between the selected regions that are weighted by features of the regions on the tissue sample image, and displaying the similarity received in the receiving, and the plurality of first regions and the plurality of second regions which are represented to be distinguishable.

Still other aspect of the present invention provides an information processing system which assists diagnosis based on a tissue sample image obtained by capturing a tissue, comprising an input unit that inputs a plurality of first regions selected as diagnosis targets from the tissue sample image, a plurality of second regions selected as diagnosis targets from the tissue sample image, and pieces of position information of the respective regions selected on the tissue sample image, a calculator that calculates a similarity between the plurality of first regions and the plurality of second regions based on correlations considering distances between the selected regions on the tissue sample image, and a display that displays the similarity calculated by the calculator, and the plurality of first regions and the plurality of second regions which are represented to be distinguishable.

Still other aspect of the present invention provides an information processing method for assisting diagnosis based on a tissue sample image obtained by capturing a tissue, comprising inputting a plurality of first regions selected as diagnosis targets from the tissue sample image, a plurality of second regions selected as diagnosis targets from the tissue sample image, and pieces of position information of the respective regions selected on the tissue sample image, calculating a similarity between the plurality of first regions and the plurality of second regions based on correlations considering distances between the selected regions on the tissue sample image, and displaying the similarity calculated in the calculating, and the plurality of first regions and the plurality of second regions which are represented to be distinguishable.

Advantageous Effects of Invention

According to the present invention, it can be evaluated whether ROIs selected by a pathologist or apparatus include an important region of interest.

BRIEF DESCRIPTION OF DRAWINGS

FIG. 7 is a chart showing the structure of a similarity accumulation DB according to the second embodiment of the present invention;

FIG. 15 is a chart showing the structure of a similarity accumulation DB according to the third embodiment of the present invention;

DESCRIPTION OF EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

Figure 1:
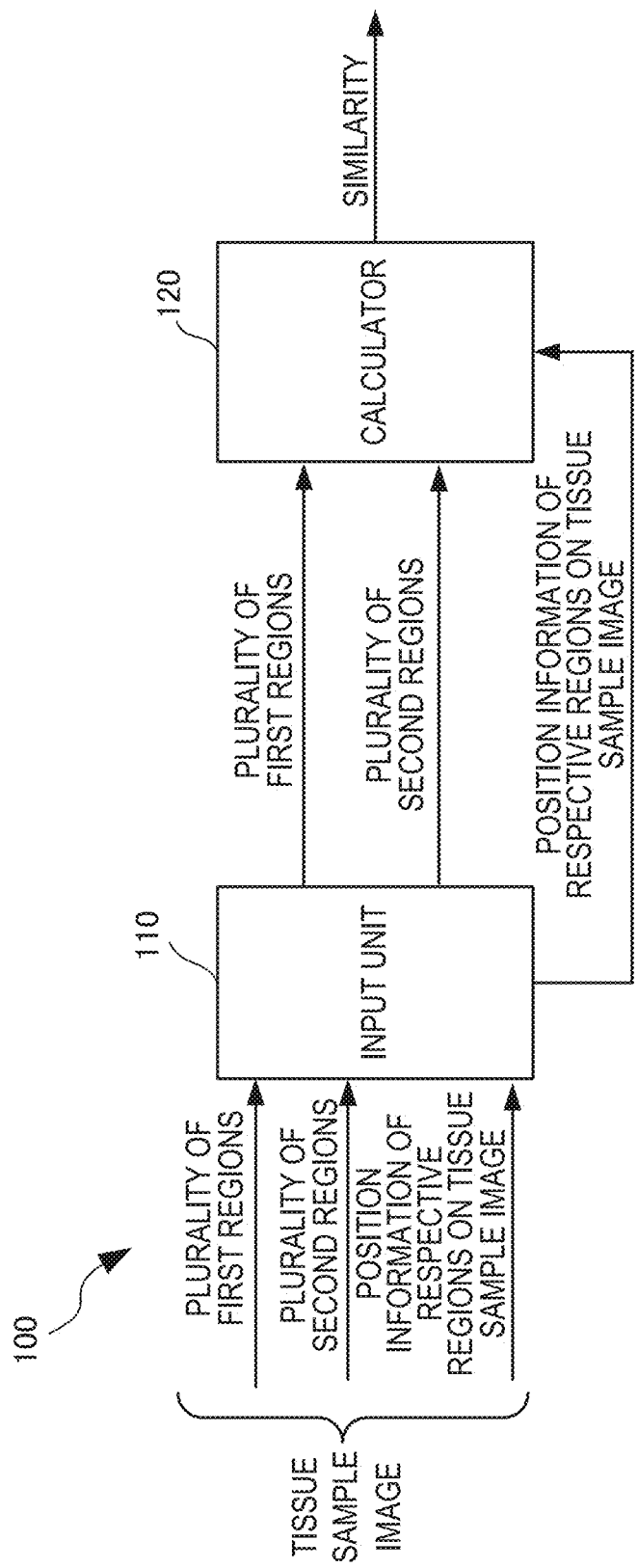
FIG. 1 is a block diagram showing the arrangement of an information processing apparatus according to the first embodiment of the present invention.

An information processing apparatus 100 according to the first embodiment of the present invention will be described with reference to FIG. 1. As shown in FIG. 1, the information processing apparatus 100 includes an input unit 110 and calculator 120. The input unit 110 inputs a plurality of first regions selected as diagnosis targets from a tissue sample image obtained by capturing a tissue, a plurality of second regions selected as diagnosis targets from the tissue sample image, and pieces of position information of the respective regions selected on the tissue sample image. The calculator 120 calculates a similarity between the first regions and the second regions based on correlations considering the distances between the selected regions on the tissue sample image.

According to the first embodiment, it can be evaluated whether ROIs selected by a pathologist or apparatus include an important region of interest.

[Second Embodiment]

In the second embodiment of the present invention, for a plurality of ROIs which have been freely selected within one tissue area of a tissue sample image and transmitted from a pathologist terminal, similarities (correlation strengths) with other ROI selection results in the same tissue area are calculated to evaluate whether the selection of the ROIs is appropriate. In the second embodiment, a pathological image analysis assistance apparatus in an analysis center automatically selects other ROIs. According to the second embodiment, the analysis center can quantitatively evaluate selection of a plurality of ROIs transmitted from a pathologist terminal.

<<Arrangement of Information Processing System Including Information Processing Apparatus According to Second Embodiment>>

Figure 2:
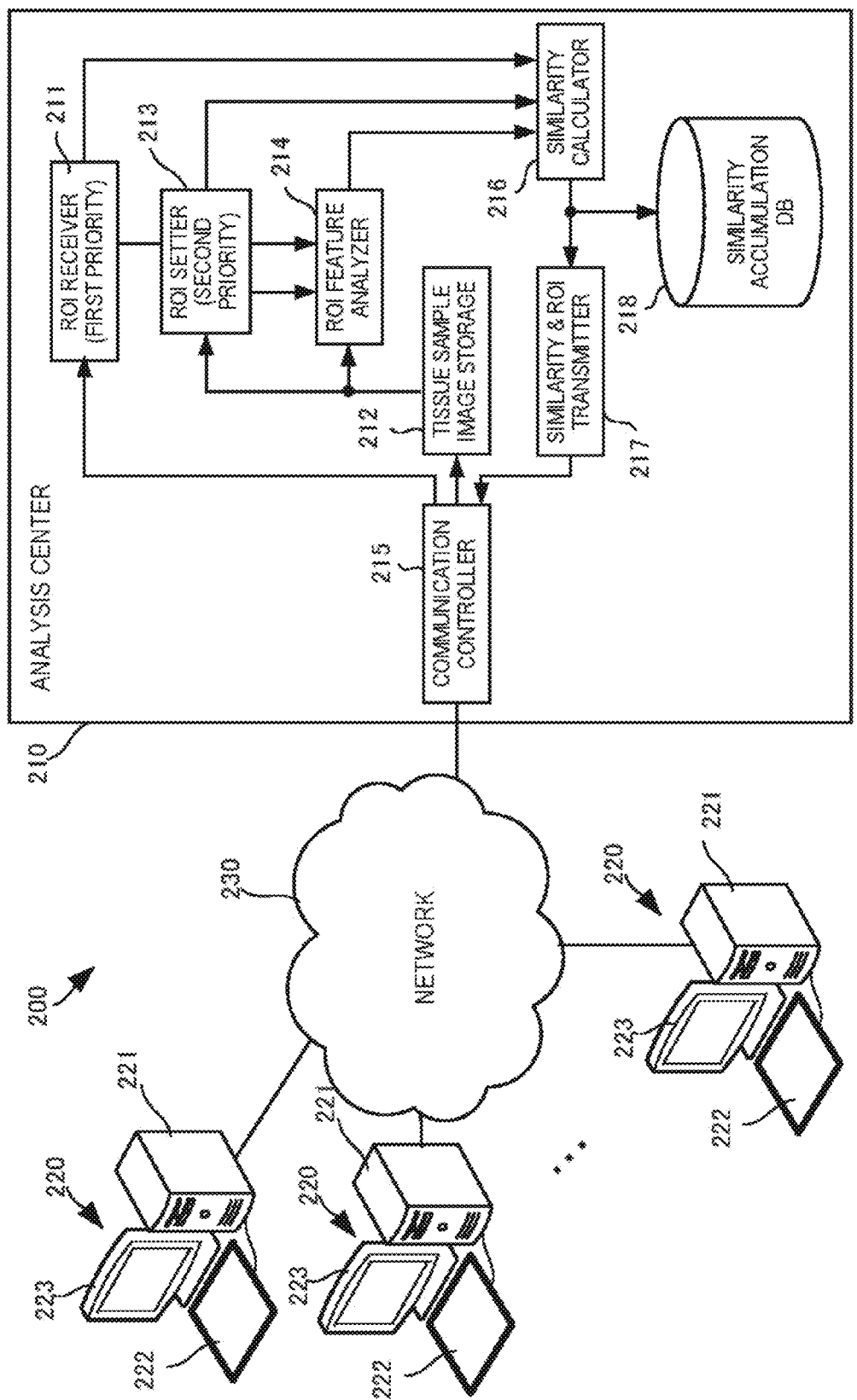
FIG. 2 is a block diagram showing the arrangement of an information processing system including an information processing apparatus according to the second embodiment of the present invention.

FIG. 2 is a block diagram showing the arrangement of an information processing system 200 including an analysis center 210 serving as an information processing apparatus according to the embodiment. The information processing system 200 in FIG. 2 includes the analysis center 210 serving as an information processing apparatus which assists pathological image diagnosis, and a plurality of pathologist terminals 220 which are connected to the analysis center 210 via a network 230 and receive assistance of pathological image diagnosis.

The analysis center 210 includes a communication controller 215 for communicating with the network 230. The analysis center 210 also includes an ROI receiver 211 which receives information of ROIs received by the communication controller 215 from the pathologist terminal 220 together with a priority order of the ROI analysis. The ROI analysis priority order from the pathologist terminal 220 will be set as the first priority order. Further, the analysis center 210 includes a tissue sample image storage 212 which stores a tissue sample image received by the communication controller 215. The analysis center 210 includes an ROI setter 213 which sets ROIs and the ROI analysis priority order based on the tissue sample image stored in the tissue sample image storage 212. The ROI analysis priority order set by the analysis center 210 will be set as the second priority order. The analysis center 210 includes an ROI feature analyzer 214 which analyzes the features of the ROIs indicated by the ROI receiver 211 and ROI setter 213 in the tissue sample image stored in the tissue sample image storage 212.

A similarity calculator 216 calculates a similarity (correlation) between the ROIs received by the ROI receiver 211 and the ROIs set by the ROI setter 213 by using the ROIs received by the ROI receiver 211, the first priority order, the ROI set by the ROI setter 213, the second priority order, and the features of the respective ROIs analyzed by the ROI feature analyzer 214. The similarity calculated by the similarity calculator 216 is transmitted by a similarity & ROI transmitter 217 via the communication controller 215 together with the ROIs set by the ROI setter 213 to a request source serving as a diagnosis assistance input source. The similarity calculated by the similarity calculator 216 is accumulated in a similarity accumulation DB 218 so that it can be searched for each request source because the similarity is referred to in subsequent diagnosis assistance.

Each pathologist terminal 220 includes a controller 221 which controls the operation of the pathologist terminal 220 and communication with the analysis center 210. The pathologist terminal 220 also includes a scanner 222 which reads, at a resolution capable of diagnosis, a pathological slide obtained by capturing a stained tissue. Further, the pathologist terminal 220 includes a display 223 which displays a tissue sample image read by the scanner 222. Assume that necessary input/output devices are connected though FIG. 2 does not illustrate a keyboard, pointing device, or the like for data input and operation instruction.

<<Operation Sequence of Information Processing System>>

Figure 3:
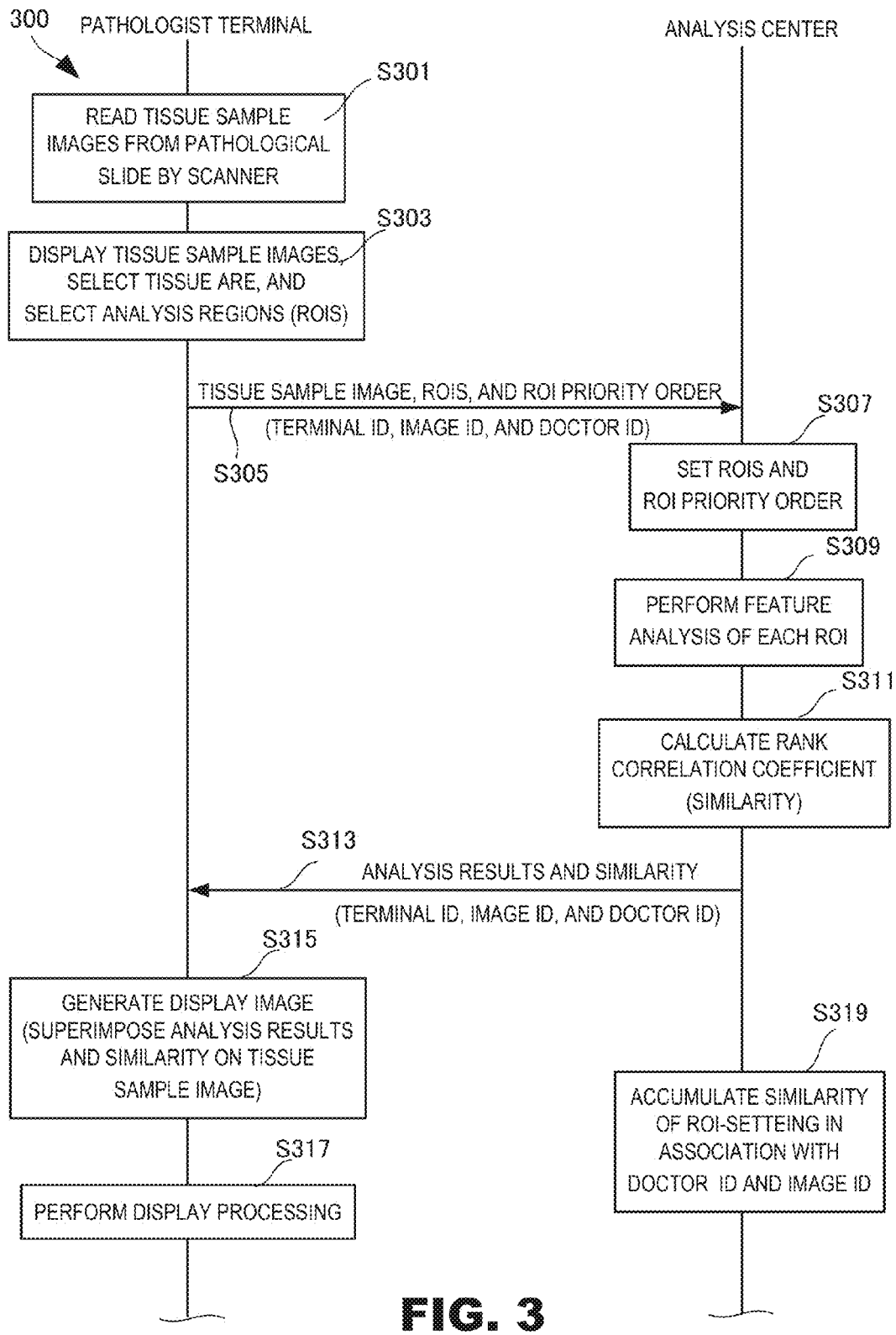
FIG. 3 is a sequence chart showing the operation procedure of the information processing system including the information processing apparatus according to the second embodiment of the present invention.

FIG. 3 is a sequence chart showing an operation procedure 300 of the information processing system including the information processing apparatus according to the embodiment. In FIG. 3, an operation from reading of a pathological slide by the scanner 222 of the pathologist terminal 220 up to screen display of diagnosis assistance information will be explained.

First, in step S301, the pathologist terminal 220 reads tissue sample images from a pathological slide by using the scanner 222. Then, in step S303, the display 223 displays the read tissue sample images. A tissue area used for diagnosis is selected from a plurality of tissue areas in the tissue sample images. Further, ROIs, analysis of which is requested of the analysis center 210 for diagnosis assistance, are selected from the selected tissue area (see FIG. 4). Note that selection of a tissue area and selection of ROIs may be designated by a pathologist from the tissue sample images on the screen of the display 223, or may be decided by existing automatic ROI-setting software.

In step S305, the pathologist terminal 220 transmits the tissue sample image, selected ROIs, and ROI analysis priority order to the analysis center 210. At least the terminal ID of the pathologist terminal 220, an image ID for specifying an image, and a doctor ID for specifying a pathologist are added to the tissue sample image to be transmitted, for the purpose of processing result transmission. The portion (for example, stomach, lung, breast, or prostate) of the captured tissue, and the staining method (for example, HE method, IHC method, or FISH method) are also added for the purpose of analysis by the analysis center 210. For example, information of the sex and age, information of the address and nationality, and the like may be added for analysis, or accumulation and analysis of information in a database (to be referred to as a DB hereinafter) as long as personal information of the patient does not leak.

In response to reception of the tissue sample image, in step S307, the analysis center 210 stores the tissue sample image, and performs tissue structure analysis by using a tissue structure analysis DB which has been registered in advance by learning based on tissue sample images. Further, the analysis center 210 uniquely sets ROIs and ROI analysis priority order. In step S309, the analysis center 210 analyzes the feature of the ROIs transmitted from the pathologist terminal 220 and that of the ROIs set by the analysis center 210 by using a feature analysis DB which has been registered in advance by learning.

In step S311, the analysis center 210 calculates a similarity (rank correlation coefficient) between the ROIs transmitted from the pathologist terminal 220 and the ROIs set by the analysis center 210 based on the pieces of position information and features of the respective ROIs. In step S313, the analysis center 210 transmits the analysis results and calculated similarity to the pathologist terminal 220. In addition, the analysis center 210 accumulates the calculated ROI-setting similarity in the similarity accumulation DB 218 in association with the doctor ID and image ID.

Figure 5:
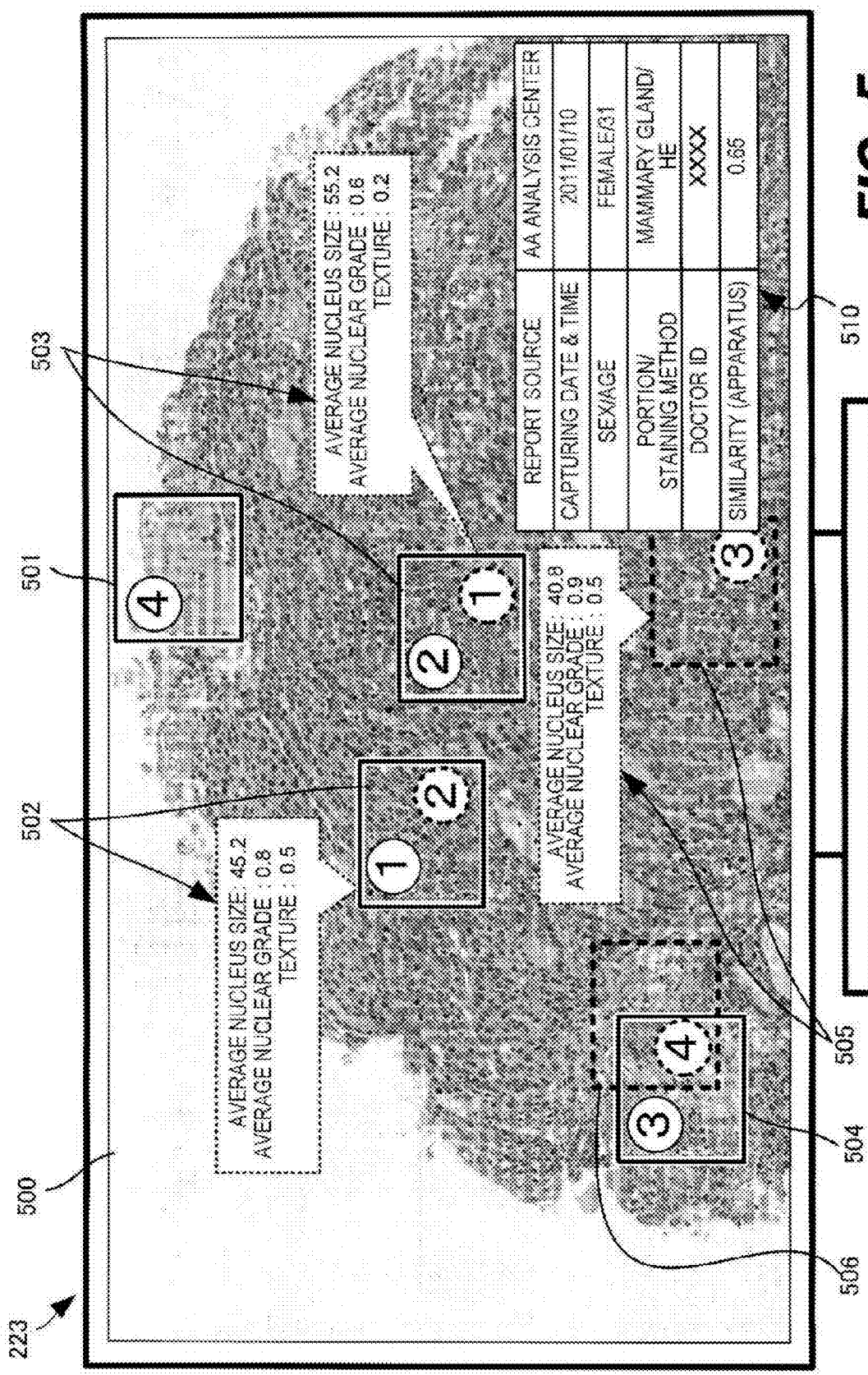
FIG. 5 is a view showing an analysis result display screen on the pathologist terminal according to the second embodiment of the present invention.

Upon receiving the analysis results and similarity, the pathologist terminal 220 superimposes in step S315 the analysis results and similarity on the tissue sample image read from the pathological slide in step S301, and displays them on the display 223 in step S317 (see FIG. 5). The pathologist can diagnose the tissue sample image by referring to the s displayed on the display 223 as assistance information, and evaluate and learn the ROI-setting by him based on the similarity.

<<Display Screen on Pathologist Terminal>>

A display screen on the display 223 in processing according to the embodiment will be explained with reference to FIGS. 4 and 5.

(Display Screen at Time of Assistance Request)

Figure 4:
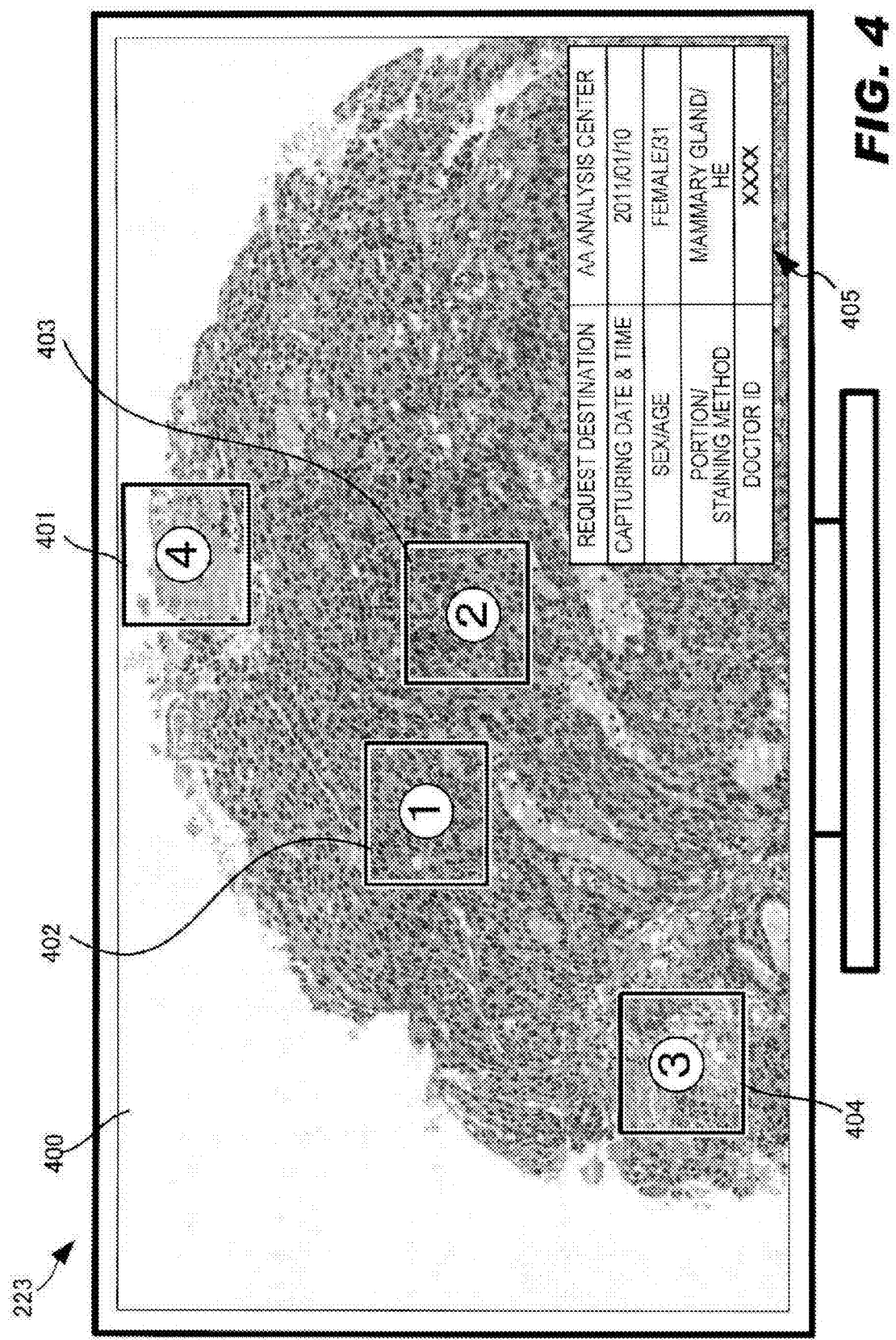
FIG. 4 is a view showing a display screen when transmitting an ROI image from a pathologist terminal according to the second embodiment of the present invention.

FIG. 4 is a view showing a screen 400 displayed on the display 223 of the pathologist terminal 220 when transmitting ROI images from the pathologist terminal according to the embodiment.

The screen 400 displays a plurality of selected ROIs 401 to 404 which are superimposed on a tissue area selected from a tissue sample image. Priority order is represented by circled numbers in the ROIs 401 to 404. The tissue sample image, pieces of position information of the ROIs 401 to 404, and the priority order are transmitted to the analysis center 210 in order to obtain diagnosis assistance information. Note that the ROI is rectangular in FIG. 4, but may have another shape such as a circle or ellipse or a shape conforming to the contour of a cluster of cells. In the embodiment, the center position of the ROI is transmitted as position information.

In FIG. 4, information 405 includes management information of the displayed tissue sample image in the pathologist terminal 220, and information for specifying the analysis center 210 as a request destination of which diagnosis assistance is requested. The information 405 includes the doctor ID of a pathologist serving as a request source. Note that the information 405 is merely an example, and is not limited to this.

(Analysis Result Display Screen)

FIG. 5 is a view showing a screen 500 displayed on the display 223 of the pathologist terminal 220 upon receiving analysis results and similarity according to the embodiment.

In FIG. 5, the analysis results of the ROIs 401 to 404 in FIG. 4 are represented by display of features analyzed in correspondence with the respective ROIs having cancer cells. No display of a feature for ROIs 501 and 504 means that the ROIs 501 and 504 are cancer cell-free areas.

ROIs 502 and 503 are displayed together with the values of the average nucleus size ($\mu m^2$), the average nuclear grade, and the texture as features.

In FIG. 5, ROIs 505 and 506 are ROIs which are different from the ROIs 501 and 504 transmitted from the pathologist terminal 220 and are set by the analysis center 210. The ROI 506 represents a cancer cell-free area, similar to the ROI 504. However, features are displayed for the ROI 505, so the ROI 505 is an ROI having cancer cells. Circled numbers of solid lines indicate the priorities of the ROIs 501 to 504 upon transmission. Circled numbers of distinguishable broken lines indicate the priorities of the ROIs 503, 502, 505, and 506 that are set by the analysis center 210.

In FIG. 5, information 510 includes management information of the displayed tissue sample image in the pathologist terminal 220, and information for specifying the analysis center 210 as a report source which has reported the analysis results for diagnosis assistance. The information 510 represents a similarity of 0.65. Note that the information 510 is merely an example, and is not limited to this. The pathologist sees this display, and can recognize an evaluation for the setting of the ROIs 401 to 404 by him.

<<Hardware Arrangement of Analysis Center>>

Figure 6:
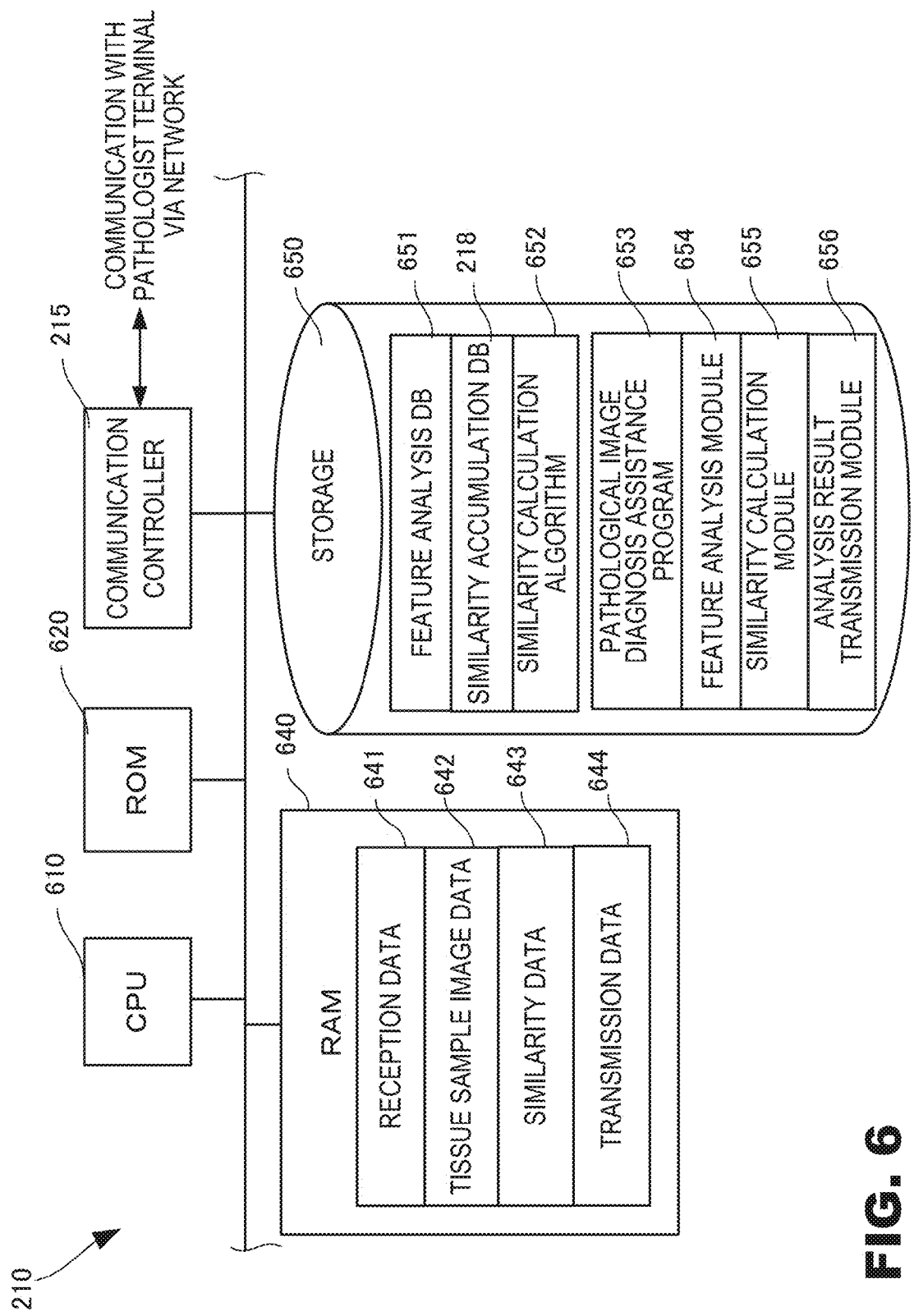
FIG. 6 is a block diagram showing the hardware arrangement of the information processing apparatus according to the second embodiment of the present invention.

FIG. 6 is a block diagram showing the hardware arrangement of the analysis center 210 according to the embodiment. FIG. 6 shows the arrangement of the analysis center 210 formed from one apparatus, but the analysis center 210 may be formed from a plurality of apparatuses for respective functions.

In FIG. 6, a CPU 610 is an arithmetic control processor, and implements the function building components of the analysis center 210 by executing a program. A ROM 620 stores permanent data and programs such as initial data and programs. The communication controller 215 controls communication with the plurality of pathologist terminals 220 via the network 230. This communication is arbitrarily wired or wireless.

A RAM 640 is a random access memory used as a temporary storage work area by the CPU 610. In the RAM 640, areas for storing data necessary to implement the embodiment are ensured. Each area stores reception data 641 including tissue sample image data and ROI position information received from the pathologist terminal 220. The RAM 640 stores tissue sample image data 642 received from the pathologist terminal 220. The RAM 640 stores similarity data 643 calculated by the analysis center 210. Also, the RAM 640 stores transmission data 644 which is to be transmitted to the pathologist terminal 220 and includes analysis results and similarity.

A storage 650 is a large-capacity storage device which stores databases, various parameters, and programs to be executed by the CPU 610 in a nonvolatile way. The storage 650 stores the following data or programs necessary to implement the embodiment. As a data storage, the storage 650 stores a feature analysis DB 651 used to perform feature analysis of an ROI based on tissue sample image data. The storage 650 stores the similarity accumulation DB 218 which accumulates calculated similarities (see FIG. 7). Also, the storage 650 stores a similarity calculation algorithm 652 serving as an algorithm including an operational expression for calculating a similarity. Note that the feature analysis DB 651 is desirably updated by feedback of image data and analysis results received from the pathologist terminal 220, and learning using statistical processing of analysis results.

Figure 8A:
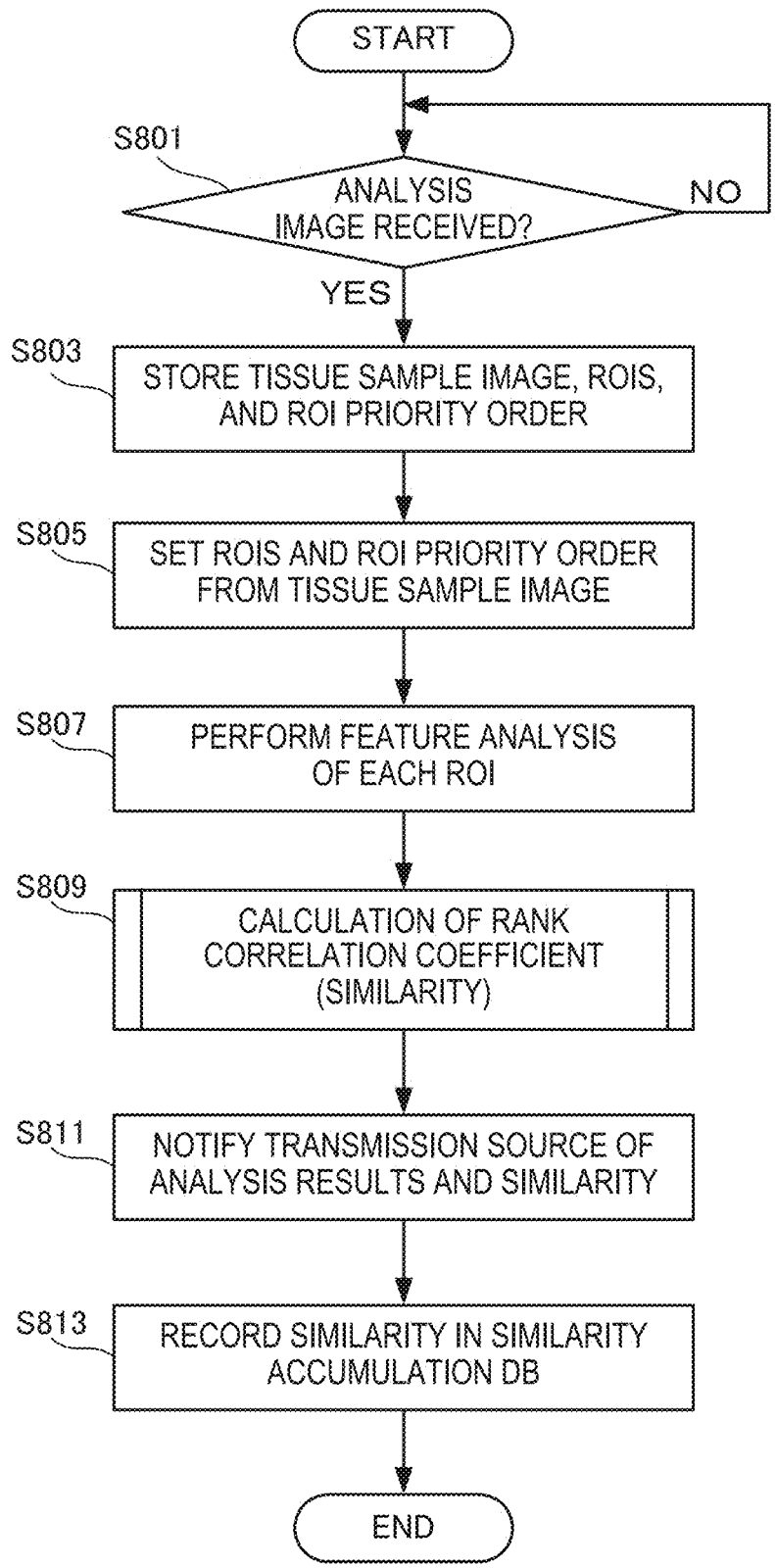
FIG. 8A is a flowchart showing the processing procedure of the information processing apparatus according to the second embodiment of the present invention.

In the embodiment, as a program, the storage 650 stores a pathological image diagnosis assistance program 653 which implements a series of pathological image diagnosis assistances (see FIG. 8A). The storage 650 stores a feature analysis module 654 which forms part of the pathological image diagnosis assistance program 653, and performs feature analysis of an ROI based on tissue sample image data by using the feature analysis DB 651. The storage 650 stores a similarity calculation module 655 which calculates a similarity by using the similarity calculation algorithm 652. The storage 650 stores an analysis result transmission module 656 which transmits analysis results and similarity as diagnosis assistance information to the pathologist terminal 220.

FIG. 6 shows only data and programs necessary for the embodiment, and does not show general-purpose data and programs such as an OS.

(Structure of Similarity Accumulation DB)

FIG. 7 is a chart showing the structure of the similarity accumulation DB 218 according to the embodiment.

Reference numeral 701 denotes a doctor ID for specifying a pathologist who has requested diagnosis assistance. Reference numeral 702 denotes a request date & time; and 703, a tissue sample image ID for specifying received tissue sample image data. Reference numerals 704, 705, and 706 denote a sex/age, a portion of a tissue sample image to be analyzed, and a staining method of a tissue, respectively, which are pieces of information associated with an analysis method in the analysis center 210, in order to classify tissue sample image data specified by the tissue sample image ID 703. Reference numeral 707 denotes a similarity which is calculated as a correlation value between an ROI received from the pathologist terminal 220 and an ROI set by the analysis center 210.

In FIG. 7, ROI information serving as the basis of calculation of each similarity 707 is stored in correspondence with each tissue sample image received from the pathologist terminal 220. For example, as ROI information 710 for which a similarity "0.65" on the second line was calculated, an ROI priority order 711, request setting information 712 received from the pathologist terminal 220, and comparison setting information 713 set by the analysis center 210 are stored. The request setting information 712 includes information 712a representing a tissue area in the tissue sample image, an ROI center position address 712b representing the center position of an ROI selected from the tissue area by a pathologist, and an ROI feature 712c analyzed by the analysis center 210. The comparison setting information 713 includes information 713a representing a tissue area set in the tissue sample image, an ROI center position address 713b representing the center position of an ROI selected from the tissue area by the analysis center 210, and an ROI feature 713c analyzed by the analysis center 210. Note that storage data of the ROI center position changes depending on the ROI shape. Similar ROI information 720 is stored as ROI information for which a similarity "0.74" on the third line was calculated. As described above, in the embodiment, the ROI center position is set as the center of the ROI shape in consideration of a change of the ROI shape, weighting of each pixel or each cell in the ROI, and the like. However, the center of the ROI shape is not limited to the center position.

Note that information of each line in the similarity accumulation DB 218 is generated in the RAM 640 before being accumulated in the similarity accumulation DB 218. A table for feature analysis and analysis result notification, and the like are also generated in the RAM 640. However, in the embodiment, calculation and notification of a similarity are main features, and notification of analysis results is accessory and thus a detailed description thereof will be omitted.

<<Operation Procedure of Analysis Center>>

FIG. 8A is a flowchart showing the operation procedure of the information processing apparatus according to the embodiment. The CPU 610 in FIG. 6 executes this flowchart by using the RAM 640, thereby implementing the functional building components of the analysis center 210 in FIG. 2.

First, in step S801, the analysis center 210 waits for reception of an analysis image and ROI from the pathologist terminal 220. If the analysis center 210 receives an image, the process advances to step S803, and the analysis center 210 stores the received tissue sample image, ROIs, and ROI priority order. In step S805, the analysis center 210 sets ROIs and ROI priority order in the received tissue sample image. The process advances to step S807, and the analysis center 210 performs feature analysis of each ROI corresponding to the portion, staining method, sex/age, and the like. In the feature analysis performed here, for example, for an HE-stained tissue of a stomach, the dimensions and shape of a cell nucleus are analyzed.

In step S809, the analysis center 210 calculates a similarity (rank correlation coefficient) between the ROIs received from the pathologist terminal 220 and the ROIs set by the analysis center 210. In step S811, the analysis center 210 transmits the feature analysis results and similarity to the pathologist terminal 220 serving as the transmission source together with an image ID obtained from the transmission source. In step S813, the analysis center 210 records the calculated similarity in the similarity accumulation DB 218 in association with the doctor ID.

(Features to be Analyzed)

Features to be analyzed in step S807 of FIG. 8A are as follows. However, the following example is an example when the HE staining method is used, and the features are not limited to them.

First, as features in tissue structure analysis of an entire ROI, a special feature is sometimes used depending on a target organ. However, the following features f1 to f10 are important features for cancer at almost all portions:

f1) nucleus size
f2) density of large nuclei=number of large nuclei/total number of nuclei
f3) density of nuclei belonging to a duct
f4) nucleus orientation
f5) nucleus flatness
f6) duct thickness
f7) color (RGB)
f8) color (HSV)
f9) duct region
f10) signal (orientation feature and alignment) filtered by the Gabor function As a global feature, information about the region such as the mucus or fat is sometimes used in addition to the above features. As a special feature, for example, there is a suspected signet ring cell (to be referred to as a signet ring hereinafter) in gastric biopsy.

As a feature in more detailed feature analysis, a special feature is sometimes used depending on a target organ. However, the following features F1 to F7 are important features for cancer at almost all portions:

F1) nucleus size
F2) major and minor axes of a nucleus
F3) circularity (it takes a maximum value of 1 as the shape is almost a circle, and a smaller value as the shape deviates from a circle)
F4) texture
F5) color (RGB)
F6) color (HSV)
F7) duct region As a special feature, for example, the presence/absence of a signet ring is confirmed based on high-magnification image data when there is a suspected signet ring in gastric biopsy based on low-magnification image data.

In actual condition judgment, the above features are used as basic features, and derivatively obtained statistical amounts such as the average, variance, median, quartile, and histogram P-percentile (for example, P=5, 25, 50, 75, 95) are calculated for each ROI and used as the features of the ROI.

Note that tissue structure analysis is performed based on low-magnification image data, and more detailed feature analysis is performed based on high-magnification image data. Thus, features of the same name used in tissue structure analysis and feature analysis are not equal because the resolutions of the images are different. For example, in analysis of low-magnification image data, the nucleus size is roughly analyzed by extracting a region stained in hematoxylin, and classifying nuclei into large and small ones based on the pixel size. To the contrary, in analysis of high-magnification image data, the contour of a nucleus is accurately extracted to calculate the size (or circularity or the like) based on the contour.

Global information such as a duct is obtained at only a low magnification. For this reason, first, a duct region is extracted to generate a duct mask in analysis of low-magnification image data of a tissue sample image, and the mask information is directly transferred to a high-magnification image data analysis module. Based on this information, the high-magnification image data analysis module checks whether the duct contains a nucleus to be analyzed, and if the duct contains a nucleus to be analyzed, determines that this nucleus is not cancer even if its size is large.

<<Correlation Value Calculation>>

Next, ROI selection correlation value calculation used in step S809 of FIG. 8A will be explained.

The embodiment introduces a rank correlation coefficient $R_1$ for calculating an ROI selection similarity depending on features in a pathological image. The rank correlation coefficient is a linear sum calculated while weighting, by a weighting coefficient serving as a function of the feature, a difference obtained by subtracting the distance between centers from 1. The rank correlation coefficient is given by the following equation:

$$R_l = \sum_{p=1}^{N} \frac{w_n(f_1, \ldots, f_M)(1-d_n)}{N} \quad \text{[Mathematical 1]}$$

where N is the total number of classifications (target regions: ROIs), $d_n$ is the distance between the centers of regions, and $w_n(f_1, \ldots, f_M)$ is a weighting coefficient which is determined by the amounts of features $f_1$ to $f_M$ contained in two regions to be compared, and whose maximum value is "1".

As a detailed setting method for the weighting coefficient $w_n(f_1, \ldots, f_M)$, first, one feature is set as (f), a region selected in the first ROI selection for comparison is set as $A_1$, and a region selected in the second ROI selection is set as $A_2$. Then, a smaller one of the features f contained in these regions is used as a reference amount. If this amount exceeds a predetermined value "$f_0$", "1" is set. If this amount is equal to or smaller than "$f_0$", a smaller one of the feature "$f_1$" of the region $A_1$ and the feature "$f_2$" of the region $A_2$ is divided by "$f_0$". That is, the weighting coefficient is given by setting:

$$w_n(f) = \begin{cases} \min\begin{Bmatrix} f \in A_1, \\ f \in A_2 \end{Bmatrix} / f_0, & \min\begin{Bmatrix} f \in A_1, \\ f \in A_2 \end{Bmatrix} \leq f_0 \\ 1, & \min\begin{Bmatrix} f \in A_1, \\ f \in A_2 \end{Bmatrix} > f_0 \end{cases} \quad \text{[Mathematical 2]}$$

Note that "$f_0$", "$f_1$", "$f_2$", and the like are detailed numerical values, and are different from the above-described feature types f1 and f2, and the like.

Figure 8B:
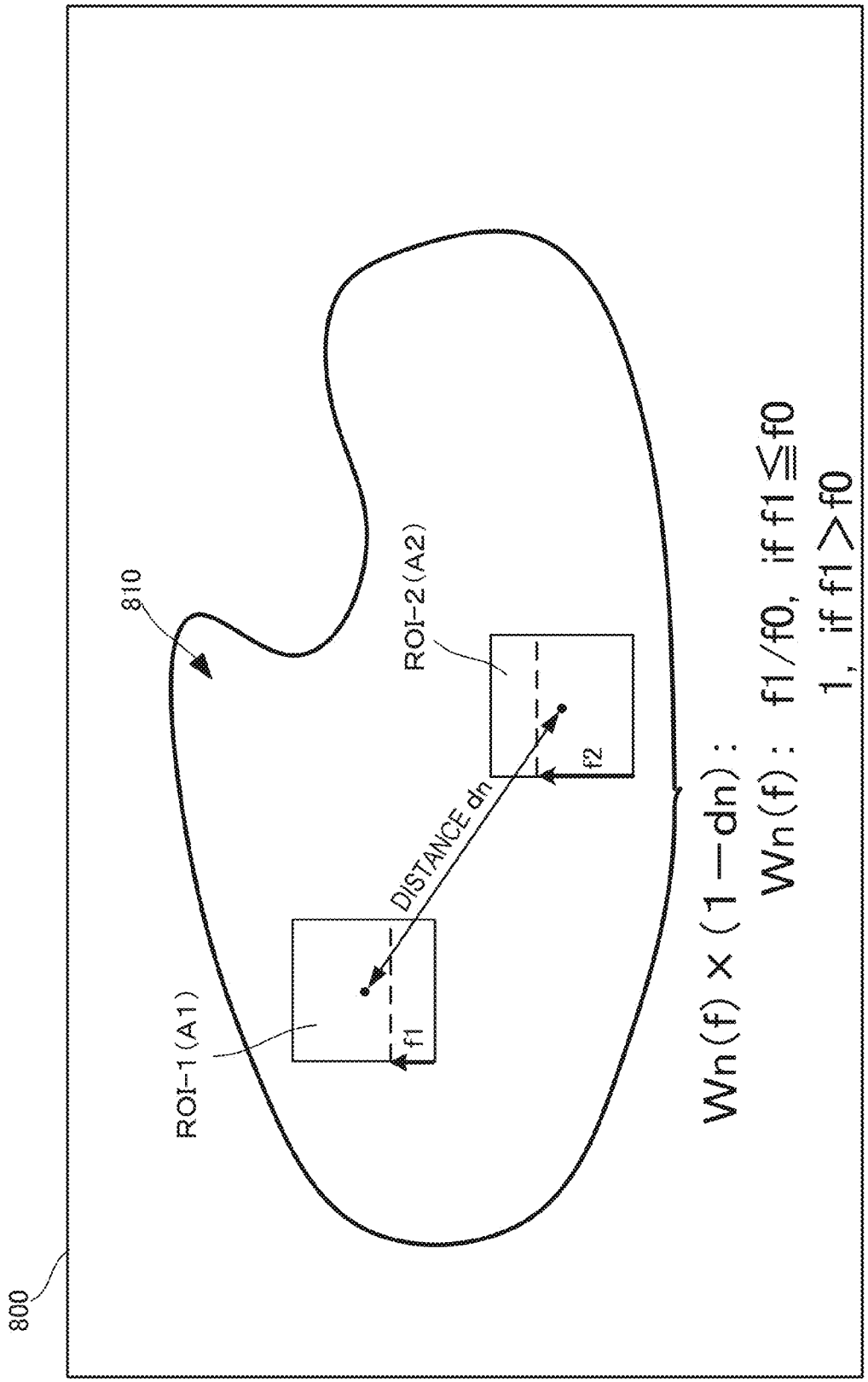
FIG. 8B is a schematic view for explaining ROI selection correlation value calculation according to the second embodiment of the present invention.

FIG. 8B is a schematic view for diagrammatically explaining correlation value calculation between the two regions A1 and A2. Two, ROI-1(A1) and ROI-2(A2) are selected in a tissue area 810 on a screen 800. Letting dn be the distance between the ROIs, and "f1" and "f2" be the features of the respective ROIs, one calculation value is calculated by wn(f)× (1−dn) shown in FIG. 8B. [Mathematical 1] executes this calculation for each ROI to obtain a linear sum.

By determining wn in this manner, the maximum value of the rank correlation $R_1$ becomes "1" (when regions coincide with each other and these two regions contain a feature f of the predetermined value "$f_0$" or more). Note that this correlation depends on even the feature of the region. Hence, even if locations coincide with each other, the correlation value does not become large unless pathological features are obtained at the two locations. This has an effect of preventing a high correlation which is based on pathologically flimsy evidence and is obtained by merely accidental coincidence.

Note that the description of [Mathematical 1] does not particularly consider the ROI priority order. However, in practical use, the difference of the similarity can be made clearer by introducing a priority so that two corresponding ROIs have the same priority in selection. However, this may excessively emphasize the difference when identical regions are selected as ROIs. In this case, the similarity needs to be adjusted by the number of ROIs or the like.

<<Hardware Arrangement of Pathologist Terminal>>

Figure 9:
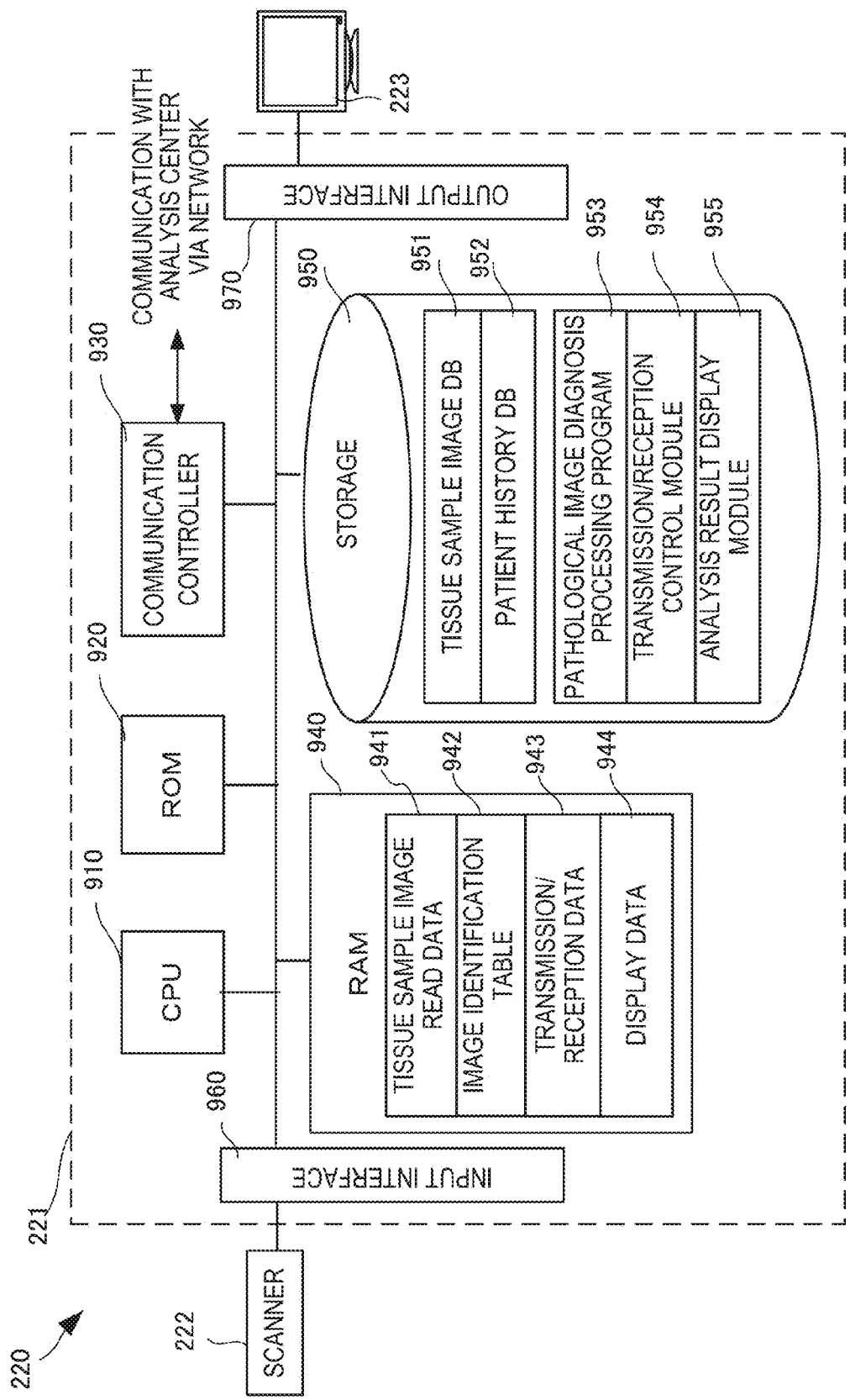
FIG. 9 is a block diagram showing the hardware arrangement of the pathologist terminal according to the second embodiment of the present invention.

FIG. 9 is a block diagram showing the hardware arrangement of the pathologist terminal 220 according to the embodiment. As shown in FIG. 2, the pathologist terminal 220 includes the controller 221, scanner 222, and display 223 as basic components.

In FIG. 9, a CPU 910 is an arithmetic control processor, and implements the controller of the pathologist terminal 220 by executing a program. A ROM 920 stores permanent data and programs such as initial data and programs. A communication controller 930 controls communication with the analysis center 210 via the network 230. This communication is arbitrarily wired or wireless.

A RAM 940 is a random access memory used as a temporary storage work area by the CPU 910. In the RAM 940, areas for storing data necessary to implement the embodiment are ensured. Each area stores tissue sample image read data 941 read from a pathological slide by the scanner 222. The RAM 940 stores an image identification table 942 for managing image data of a tissue sample image to be transmitted to the analysis center 210 and a notified similarity (rank correlation coefficient), and specifying a patient, portion, ROI, and the like (see FIG. 10). Also, the RAM 940 stores transmission/reception data 943 to be transmitted to and received from the analysis center 210 (see FIG. 10). Further, the RAM 940 stores display data 944 to be displayed on the display 223 of the pathologist terminal 220.

A storage 950 is a large-capacity storage device which stores databases, various parameters, and programs to be executed by the CPU 910 in a nonvolatile way. The storage 950 stores the following data or programs necessary to implement the embodiment. As a data storage, the storage 950 stores a tissue sample image DB 951 which is obtained by reading by the scanner 222 and is locally accumulated by a pathologist. Also, the storage 950 stores a patient history DB 952 which holds a diagnosis history corresponding to a patient.

Figure 11:
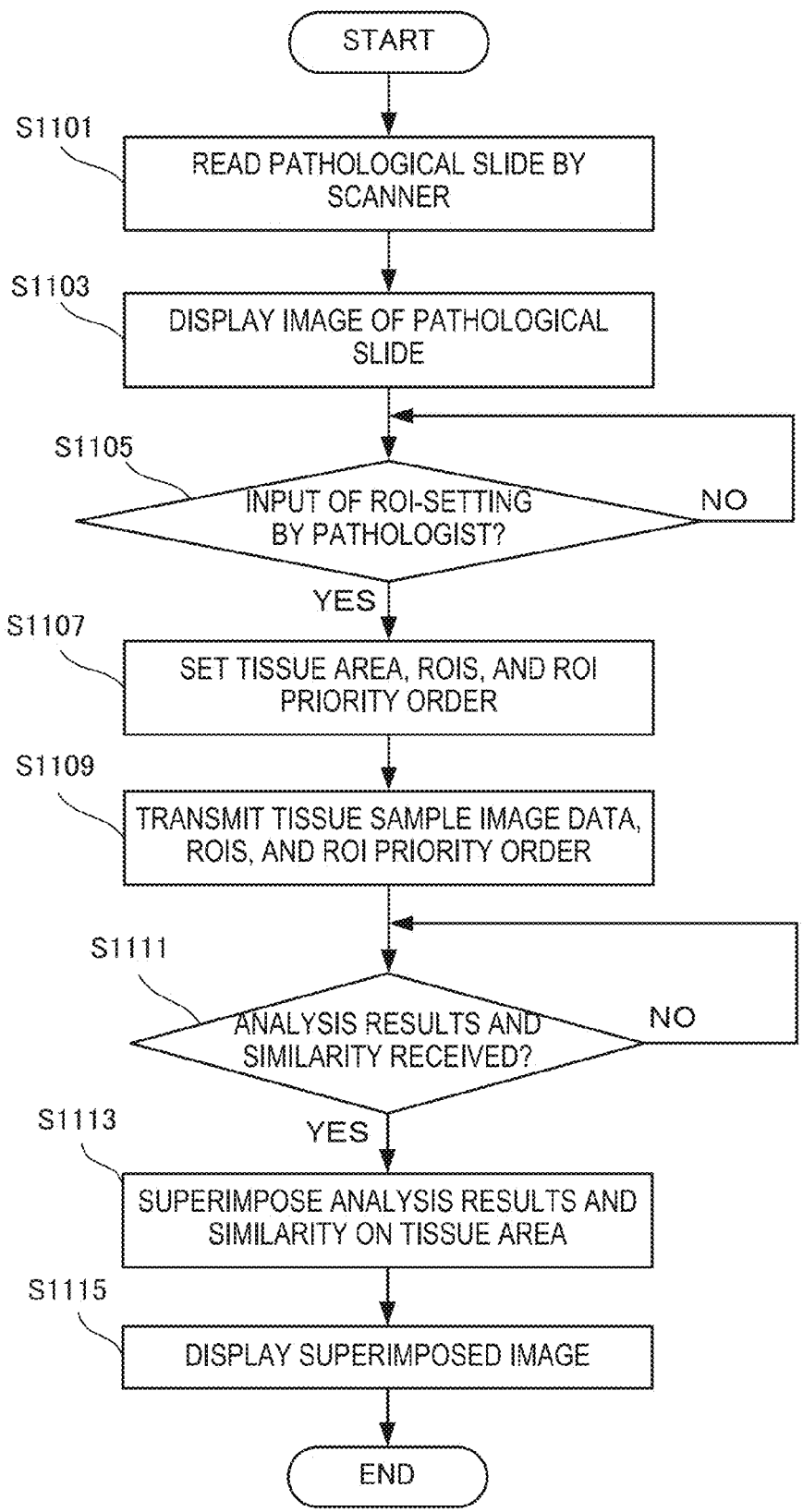
FIG. 11 is a flowchart showing the processing procedure of the pathologist terminal according to the second embodiment of the present invention.

In the embodiment, as a program, the storage 950 stores a pathological image diagnosis processing program 953 including processing to request pathological image diagnosis assistance of the analysis center 210 (see FIG. 11). The storage 950 stores a transmission/reception control module 954 which forms part of the pathological image diagnosis processing program 953, and controls data communication with the analysis center 210. The storage 950 stores an analysis result display module 955 which superimposes and displays, on a tissue sample image, analysis results received from the analysis center 210.

An input interface 960 is an interface which inputs control signals and data necessary for control by the CPU 910. In the embodiment, the input interface 960 inputs image data of a tissue sample image obtained by reading a pathological slide by the scanner 222. Note that a keyboard, pointing device, and the like are not illustrated. An output interface 970 is an interface which outputs control signals and data to a device under the control of the CPU 910. In the embodiment, the output interface 970 outputs a tissue sample image to the display 223, diagnosis assistance request information to the analysis center 210, or analysis results and similarity transmitted from the analysis center 210.

FIG. 9 shows only data and programs necessary for the embodiment, and does not show general-purpose data and programs such as an OS.

(Structures of Image Identification Table and Transmission/reception Data)

Figure 10:
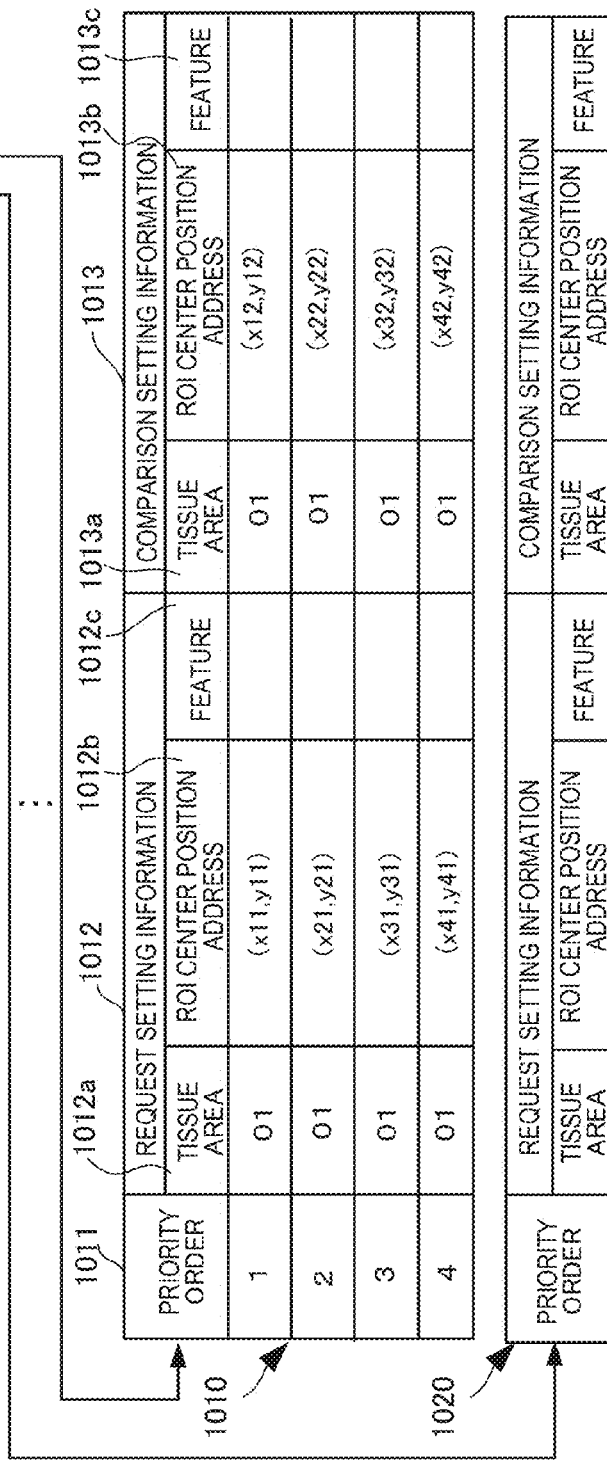
FIG. 10 is a chart showing the structures of an image identification table and transmission/reception data according to the second embodiment of the present invention.

FIG. 10 is a chart showing the structures of the image identification table 942 and transmission/reception data 943 according to the embodiment.

Reference numeral 1001 denotes a patient ID for specifying a patient; 1002, a tissue sample image capturing date & time; and 1003, a tissue sample image ID for specifying a tissue sample image. Reference numeral 1004 denotes a sex/age of a patient; 1005, a portion of a tissue sample image to be analyzed; and 1006, a staining method of a tissue that is information associated with an analysis method in the analysis center 210. Reference numeral 1007 denotes a calculated similarity which is a correlation value between an ROI received from the pathologist terminal 220 and an ROI set by the analysis center 210.

In FIG. 10, ROI information serving as the basis of calculation of each similarity 1007 is stored in correspondence with each tissue sample image which was read by the scanner and for which diagnosis assistance was requested. For example, as ROI information 1010 for which a similarity "0.65" on the second line was calculated, an ROI priority order 1011, request setting information 1012 transmitted to the analysis center 210, and comparison setting information 1013 set by the analysis center 210 are stored. The request setting information 1012 includes information 1012a representing a tissue area in the tissue sample image, an ROI center position address 1012b representing the center position of an ROI selected from the tissue area by a pathologist, and an ROI feature 1012c analyzed by the analysis center 210. The comparison setting information 1013 includes information 1013a representing a tissue area set in the tissue sample image, an ROI center position address 1013b representing the center position of an ROI selected from the tissue area by the analysis center 210, and an ROI feature 1013c analyzed by the analysis center 210. Note that storage data of the ROI center position changes depending on the ROI shape. Similar ROI information 1020 is stored as ROI information for which a similarity "0.74" on the third line was calculated. As described above, in the embodiment, the ROI center position is set as the center of the ROI shape in consideration of a change of the ROI shape, weighting of each pixel or each cell in the ROI, and the like. However, the center of the ROI shape is not limited to the center position.

Some pieces of information which are highly necessary among the above pieces of information may be accumulated as a DB in the pathologist terminal 220. However, all pieces of information need not be accumulated because they are accumulated in the analysis center 210 in association with the doctor ID (see FIG. 7).

<<Operation Procedure of Pathologist Terminal>>

FIG. 11 is a flowchart showing the processing procedure of the pathologist terminal 220 according to the embodiment. The CPU 910 in FIG. 9 executes this flowchart by using the RAM 940, thereby implementing the function of the pathologist terminal 220 in FIG. 2.

First, in step S1101, the pathologist terminal 220 reads a pathological slide by the scanner 222 at a resolution corresponding to a magnification capable of analysis. In step S1103, the pathologist terminal 220 displays an image corresponding to the read pathological slide on the display 223. In step S1105, the pathologist terminal 220 waits for input of an ROI-setting by a pathologist. If the ROI-setting is input, the process advances to step S1107, a tissue area as an analysis request target is selected from the tissue sample image corresponding to the pathological slide, ROIs are set from the tissue area, and an ROI priority order is set. An example in which a plurality of ROIs selected to request analysis are superimposed and displayed on the selected tissue area as a result of the processing in step S1107 corresponds to FIG. 4.

In step S1109, the pathologist terminal 220 transmits the read tissue sample image data, set ROIs, and ROI priority order to the analysis center 210 together with the doctor ID and image ID. Note that the terminal ID for specifying the pathologist terminal 220, and information associated with the analysis method in the analysis center 210 are also transmitted together. In step S1111, the pathologist terminal 220 waits for reception of analysis results and similarity from the analysis center 210. If the pathologist terminal 220 receives analysis results and similarity, the process advances to step S1113, and the pathologist terminal 220 generates a display screen on which the analysis results and similarity are superimposed on the tissue area to be analyzed. In step S1115, the pathologist terminal 220 displays the display screen generated by superimposition on the display 223 to assist diagnosis by the pathologist (see FIG. 5).

[Third Embodiment]

In the second embodiment, a comparison target for which a similarity with ROIs transmitted from the pathologist terminal 220 is calculated, is ROIs set by the analysis center 210. In the third embodiment, an analysis center 210 transmits a received tissue sample image to a specialist terminal to request an ROI-setting of the specialist terminal, instead of the analysis center 210. Then, the analysis center 210 calculates a similarity with the ROI-setting by the specialist. According to the third embodiment, the pathologist can evaluate his level of proficiency or the like, and can have a discussion about the ROI-setting criterion and the like.

<<Arrangement of Information Processing System Including Information Processing Apparatus According to Third Embodiment>>

Figure 12:
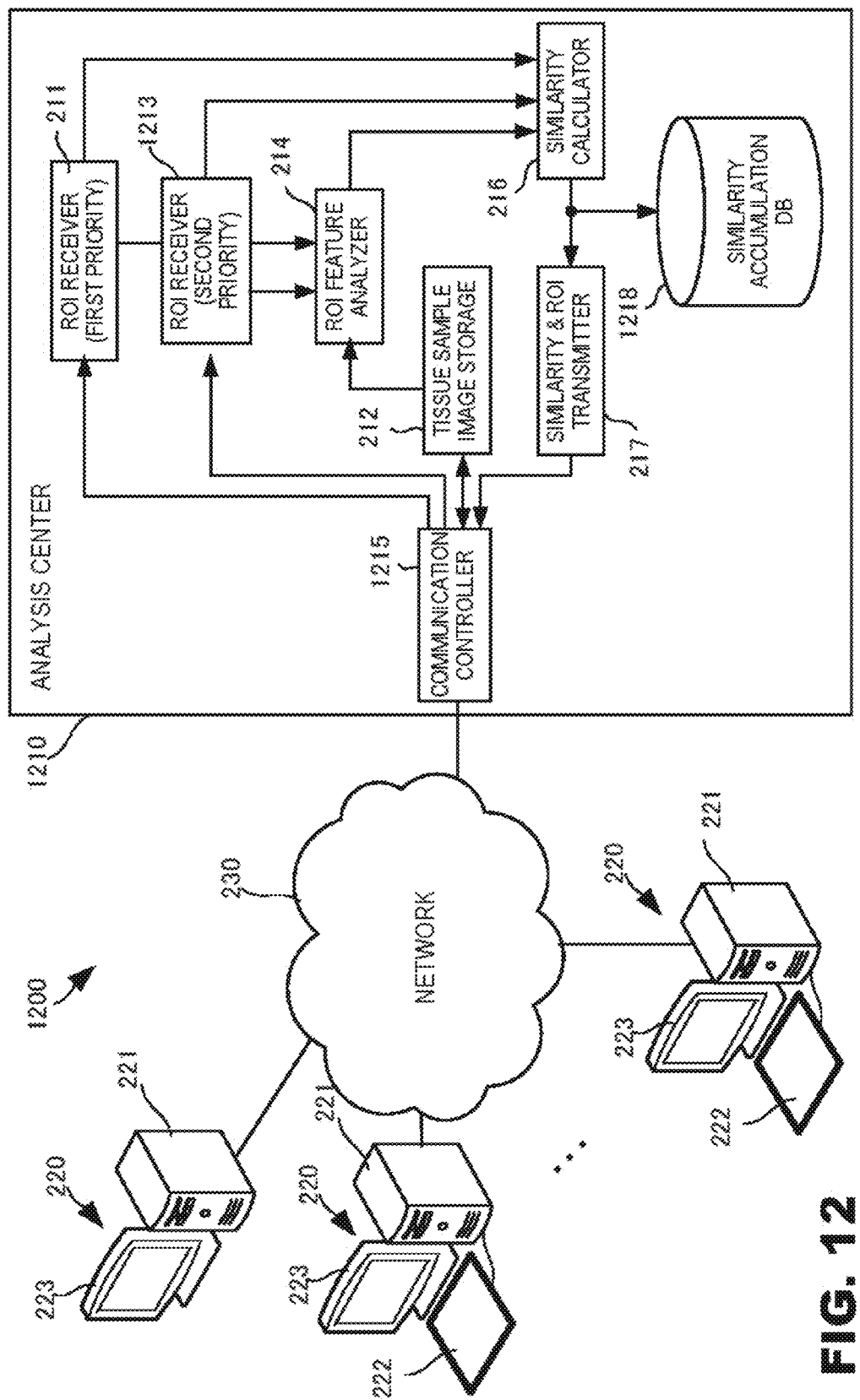
FIG. 12 is a block diagram showing the arrangement of an information processing system including an information processing apparatus according to the third embodiment of the present invention.

FIG. 12 is a block diagram showing the arrangement of an information processing system 1200 including an analysis center 1210 serving as an information processing apparatus according to the embodiment.

The information processing system 1200 in FIG. 12 includes the analysis center 1210 serving as the information processing apparatus which assists pathological image diagnosis, a plurality of pathologist terminals 220 which are connected to the analysis center 1210 via a network 230 and receive assistance of pathological image diagnosis, and a specialist terminal 1220 which assists pathological image diagnosis.

A difference of the analysis center 1210 from the analysis center 210 in FIG. 2 will be explained. The same reference numerals as those in FIG. 2 denote the same functional components, and a detailed description thereof will not be repeated. A communication controller 1215 for communicating with the network 230 controls communication with the specialist terminal 1220 in addition to the plurality of pathologist terminals 220. Together with an ROI analysis priority, an ROI receiver 1213 receives ROI information that has been received by the communication controller 1215 from the specialist terminal 1220 serving as the request destination. In this case, the analysis priority order of the ROIs set by the specialist will be set as the second priority order. An ROI feature analyzer 214 analyzes the features of the ROIs indicated by an ROI receiver 211 and the ROI receiver 1213 in a tissue sample image stored in a tissue sample image storage 212.

A similarity calculator 216 calculates a similarity (correlation) between the ROIs received by the ROI receiver 211 and the ROIs received by an ROI receiver 1213, by using the ROIs and the first priority received by the ROI, the ROIs and the second priority received by the ROI receiver 1213, and the features of the respective ROIs analyzed by the ROI feature analyzer 214. The similarity calculated by the similarity calculator 216 is transmitted by a similarity & ROI transmitter 217 via the communication controller 1215 together with the ROIs received by the ROI setter 213 to the diagnosis assistance request source. The similarity calculated by the similarity calculator 216 is accumulated in a similarity accumulation DB 1218 so that it can be searched for each request source, including even comparison target information by the specialist, because the similarity is referred to in subsequent diagnosis assistance.

The specialist terminal 1220 includes a controller 1221 which controls the operation of the specialist terminal 1220 and communication with the analysis center 1210. The specialist terminal 1220 also includes a display 1223 which displays a tissue sample image transmitted from the analysis center 210. Assume that necessary input/output devices are connected though FIG. 12 does not illustrate a keyboard, pointing device, or the like for data input and operation instruction.

The ROI-setting request target is a specialist in the above description, but may be another pathologist who is not a specialist, or another analysis center.

<<Operation Sequence of Information Processing System>>

Figure 13:
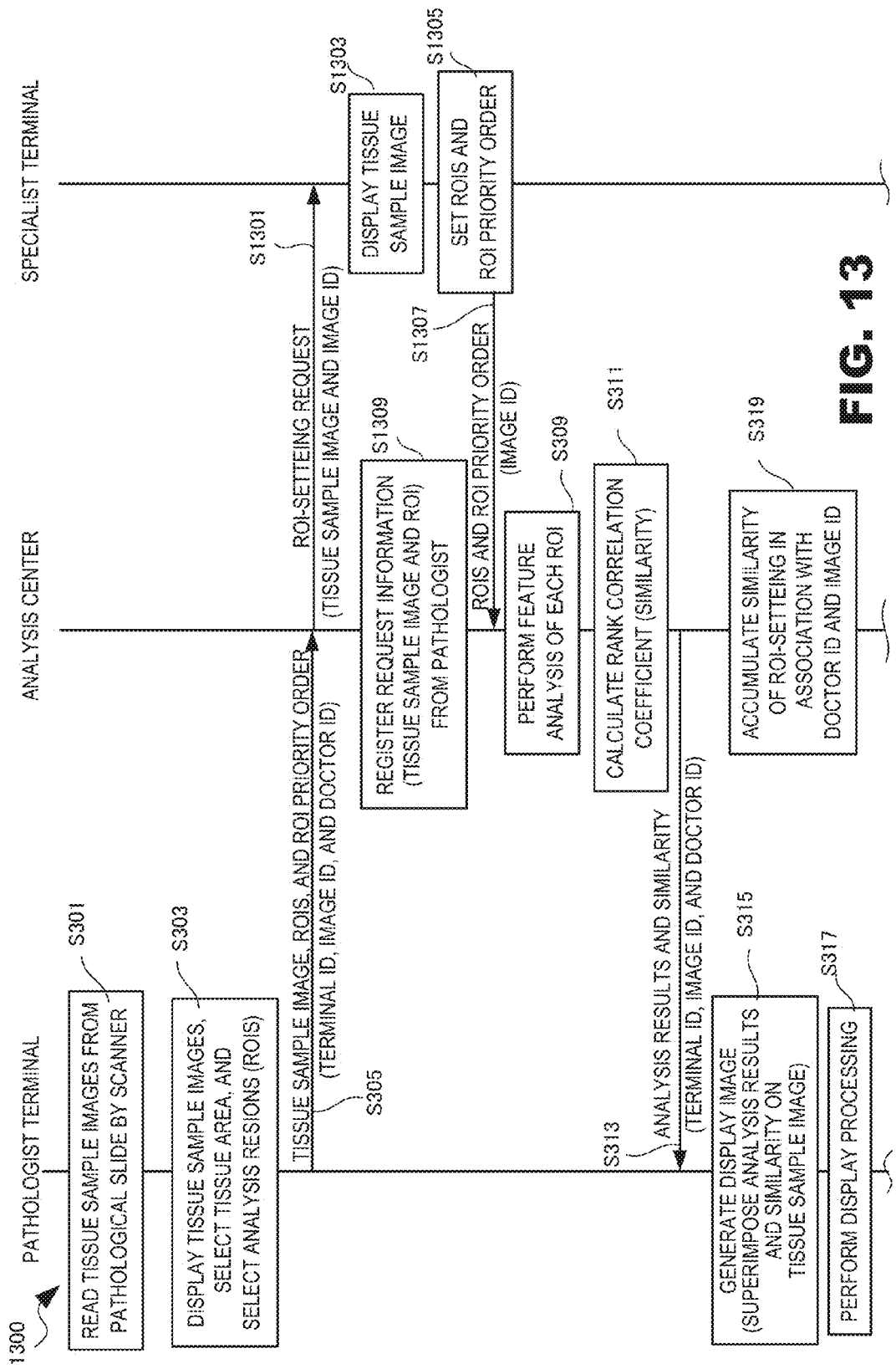
FIG. 13 is a sequence chart showing the operation procedure of the information processing system including the information processing apparatus according to the third embodiment of the present invention.

FIG. 13 is a sequence chart showing an operation procedure 1300 of the information processing system including the information processing apparatus according to the embodiment. In FIG. 13, an operation from reading of a pathological slide by the scanner 222 of the pathologist terminal 220 up to screen display of diagnosis assistance information will be explained. Note that the same reference numerals as those in FIG. 3 denote the same steps, and a description thereof will not be repeated.

In step S305, the analysis center 1210 receives a tissue sample image, selected ROIs, and ROI priority order which have been transmitted from the pathologist terminal 220 to the analysis center 1210. In step S1301, the analysis center 1210 requests an ROI-setting of the specialist terminal 1220. The tissue sample image, and an image ID for specifying the tissue sample image are added to the ROI-setting request.

In step S1303, the specialist terminal 1220 displays the tissue sample image received from the analysis center 1210. The specialist terminal 1220 sets ROIs and ROI priority order by the specialist in step S1305, and reports the setting result to the analysis center 1210 in step S1307.

The analysis center 1210 registers the request information (for example, the tissue sample image and ROIs) from the pathologist terminal 220 in step S1309, and waits for a report from the specialist terminal 1220. If the analysis center 1210 receives the report of the ROIs and ROI priority order from the specialist terminal 1220, it analyzes the features of the respective ROIs in step S309. Processes up to step S317 are the same as those in FIG. 3 except that the comparison target is not ROIs set by the analysis center, but ROIs set by the specialist, and thus a description thereof will not be repeated.

<<Display Screen on Pathologist Terminal>>

A display screen on a display 223 in processing according to the embodiment will be explained with reference to FIG. 14. Note that a display on the display 223 in a diagnosis assistance request from the pathologist terminal 220 is the same as that in FIG. 4, and a description thereof will not be repeated.

(Analysis Result Display Screen)

Figure 14:
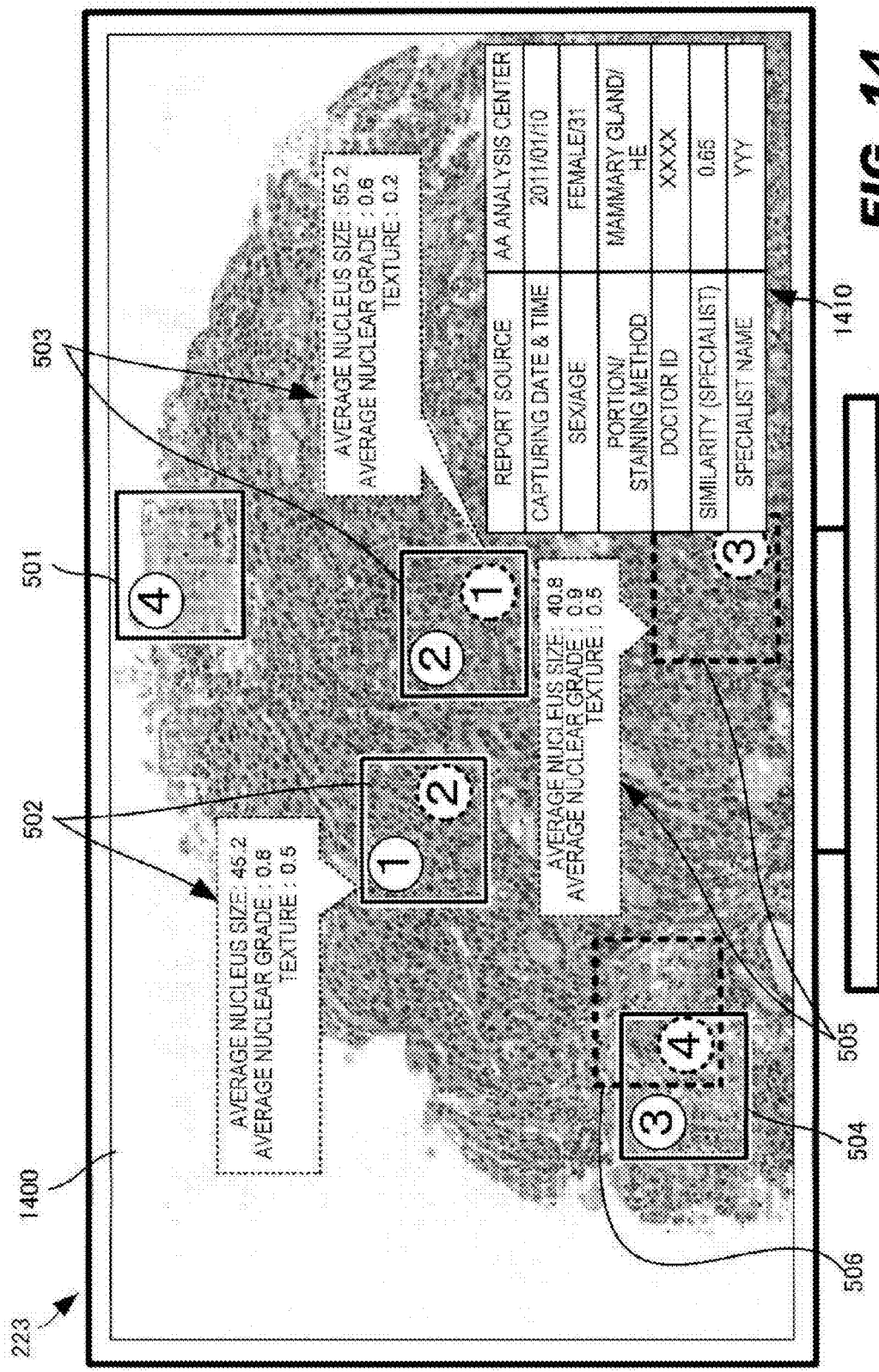
FIG. 14 is a view showing an analysis result display screen on a pathologist terminal according to the third embodiment of the present invention.

FIG. 14 is a view showing an analysis result display screen 1400 displayed on the display 223 of the pathologist terminal 220 according to the embodiment. Note that the same reference numerals as those in FIG. 5 denote the same elements in the display screen 1400 of FIG. 14, and a description thereof will not be repeated.

In FIG. 14, the name of a specialist to whom the ROI similarity was calculated is added to information 1410, in addition to information 510 of FIG. 5. Note that the information 1410 is merely an example, and is not limited to this. The pathologist sees this display, and can recognize an evaluation for the setting of ROIs 401 to 404 in FIG. 4 by him.

(Structure of Similarity Accumulation DB)

FIG. 15 is a chart showing the structure of the similarity accumulation DB 1218 according to the embodiment. The structure of the similarity accumulation DB 1218 in FIG. 15 is different from FIG. 7 only in that a specialist name 1209 is added. The same reference numerals as those in FIG. 7 denote the same elements, and a description thereof will not be repeated.

<<Operation Procedure of Analysis Center>>

Figure 16:
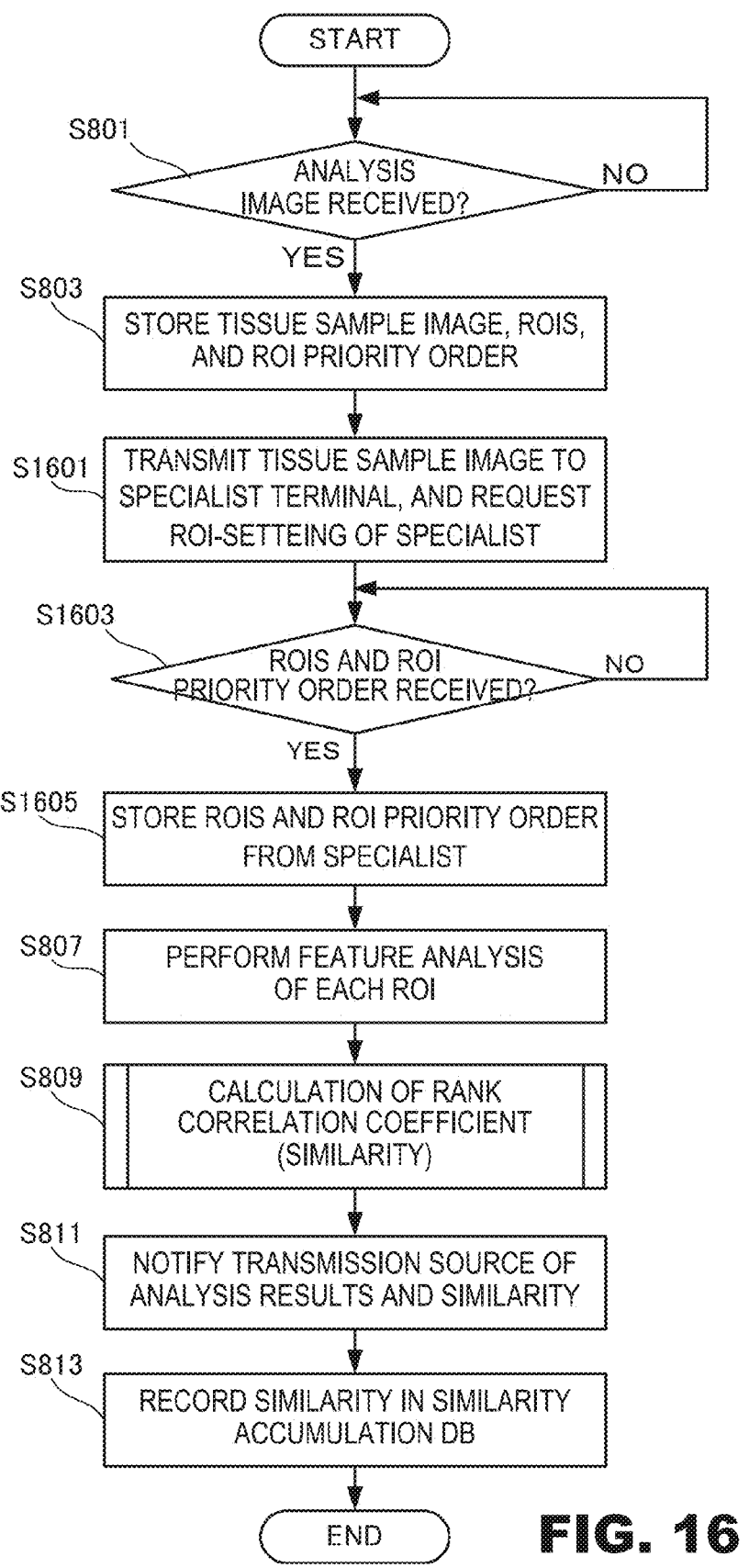
FIG. 16 is a flowchart showing the processing procedure of the information processing apparatus according to the third embodiment of the present invention.

FIG. 16 is a flowchart showing the processing procedure of the information processing apparatus according to the embodiment. A CPU (not shown) executes this flowchart by using a RAM, thereby implementing the functional building components of the analysis center 1210 in FIG. 12. The flowchart in FIG. 16 is different from FIG. 8 in that steps S1601 to S1605 replace step S805 of FIG. 8. The same reference numerals denote processes in the same steps, so a description thereof will not be repeated and only the difference will be explained.

After the analysis center 1210 stores information received from the pathologist terminal 220 in step S803, it transmits a tissue sample image received from the pathologist terminal 220 to the specialist terminal 1220 to request an ROI-setting by the specialist in step S1601. In step S1603, the analysis center 1210 waits for reception of an ROI-setting report from the specialist terminal 1220. If the analysis center 1210 receives the report, the process advances to step S1605, and the analysis center 1210 stores ROIs and ROI priority order received from the specialist terminal 1220. Subsequently, feature analysis of each ROIs and calculation of a rank correlation coefficient (similarity) are executed similarly to FIG.

8. In step S813, the calculated similarity and specialist name are recorded in the similarity accumulation DB 1218 in association with the doctor ID.

[Fourth Embodiment]

In the second and third embodiments, correlations (similarities) with ROI-settings by the analysis center or ROI-settings by the specialist are calculated for a plurality of ROIs freely set in a selected tissue area by a pathologist. In the fourth embodiment, the tissue area is divided into a plurality of blocks (corresponding to ROIs: see FIGS. 17 and 18) of predetermined region ranges in a matrix, instead of a plurality of ROIs freely set in the tissue area. The pathologist selects, as ROIs, blocks to be analyzed from the plurality of blocks. Hence, calculation of a rank correlation coefficient (similarity) becomes calculation between two block selection ranks representing which blocks have been selected from a plurality of common blocks. However, it is considered that a normalized positional relationship in the tissue area between a plurality of blocks divided into predetermined region ranges in a matrix tacitly contributes to calculation between two block selection ranks. Thus, the positional relationship, which is one feature of a pathological image, is taken into consideration. According to the fourth embodiment, the ROI-setting by a pathologist can be quantitatively evaluated by simpler similarity calculation, compared to the second and third embodiments.

The arrangement and operation of an information processing system according to the third embodiment, and those of a pathologist terminal, specialist terminal, and analysis center which form the information processing system are the same as those in the second and third embodiments. The fourth embodiment is different from the second and third embodiments in that ROIs are set by selection from a plurality of blocks obtained by dividing in advance a tissue area into predetermined region ranges in a matrix, and in correspondence with this, a different operational expression is used for the rank correlation coefficient (similarity) in FIG. 8. The differences will be explained below.

<<Display Screen on Pathologist Terminal>>

A display screen on a display 223 in processing according to the embodiment will be explained with reference to FIGS. 17 and 18.

(Display Screen at Time of Assistance Request)

Figure 17:
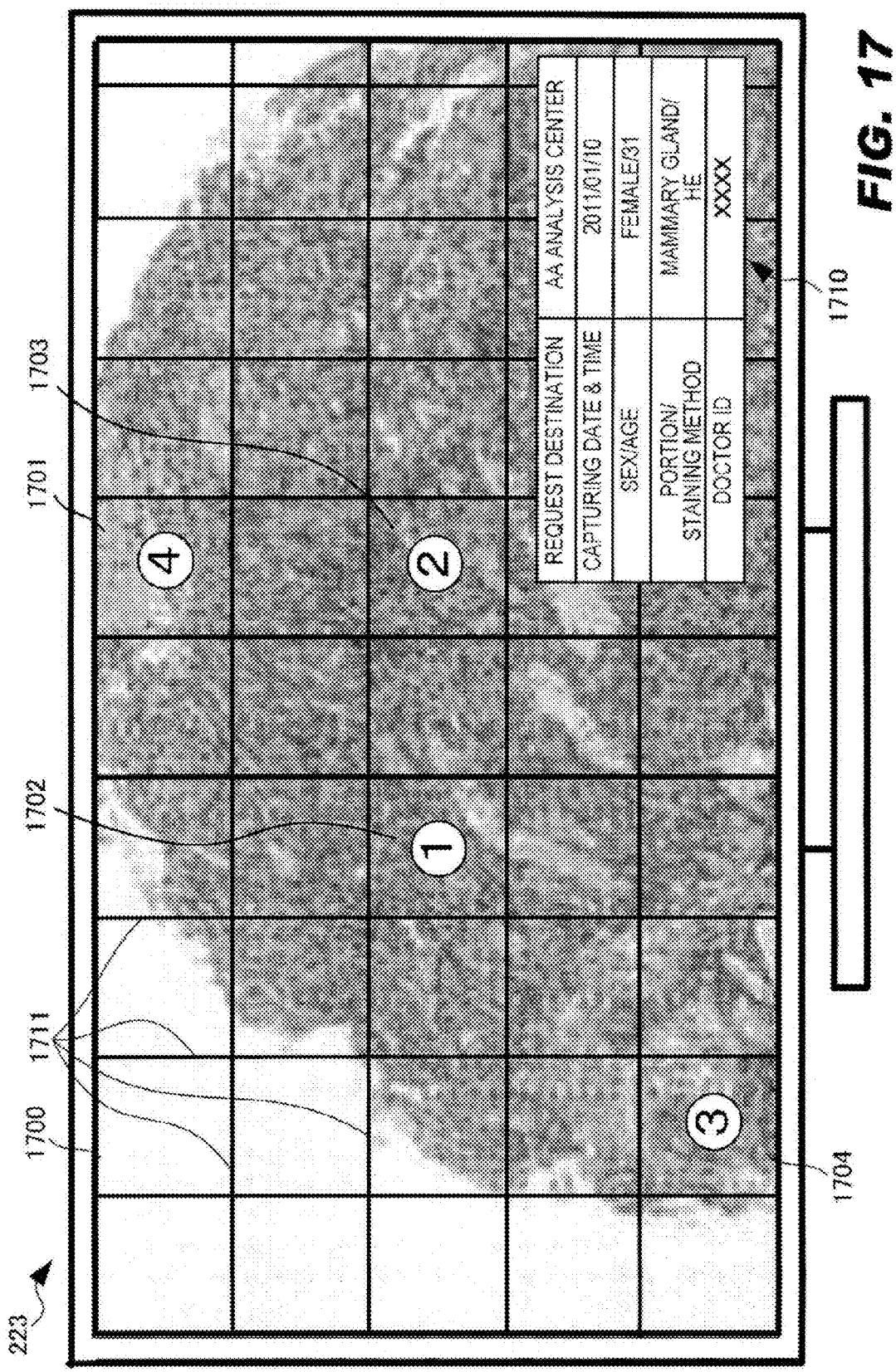
FIG. 17 is a view showing a display screen when transmitting an ROI image from a pathologist terminal according to the fourth embodiment of the present invention.

FIG. 17 is a view showing a display screen 1700 displayed on the display 223 when transmitting ROI images from a pathologist terminal 220 according to the embodiment.

Grid lines 1711 at an interval based on the magnification of a tissue sample image or the like are superimposed in advance on the display screen 1700. In blocks 1701 to 1704 serving as grids, the priorities of these blocks serving as ROIs selected by a pathologist are displayed as circled numbers. Information 1710 includes a doctor ID at a request destination or request source.

(Analysis Result Display Screen)

Figure 18:
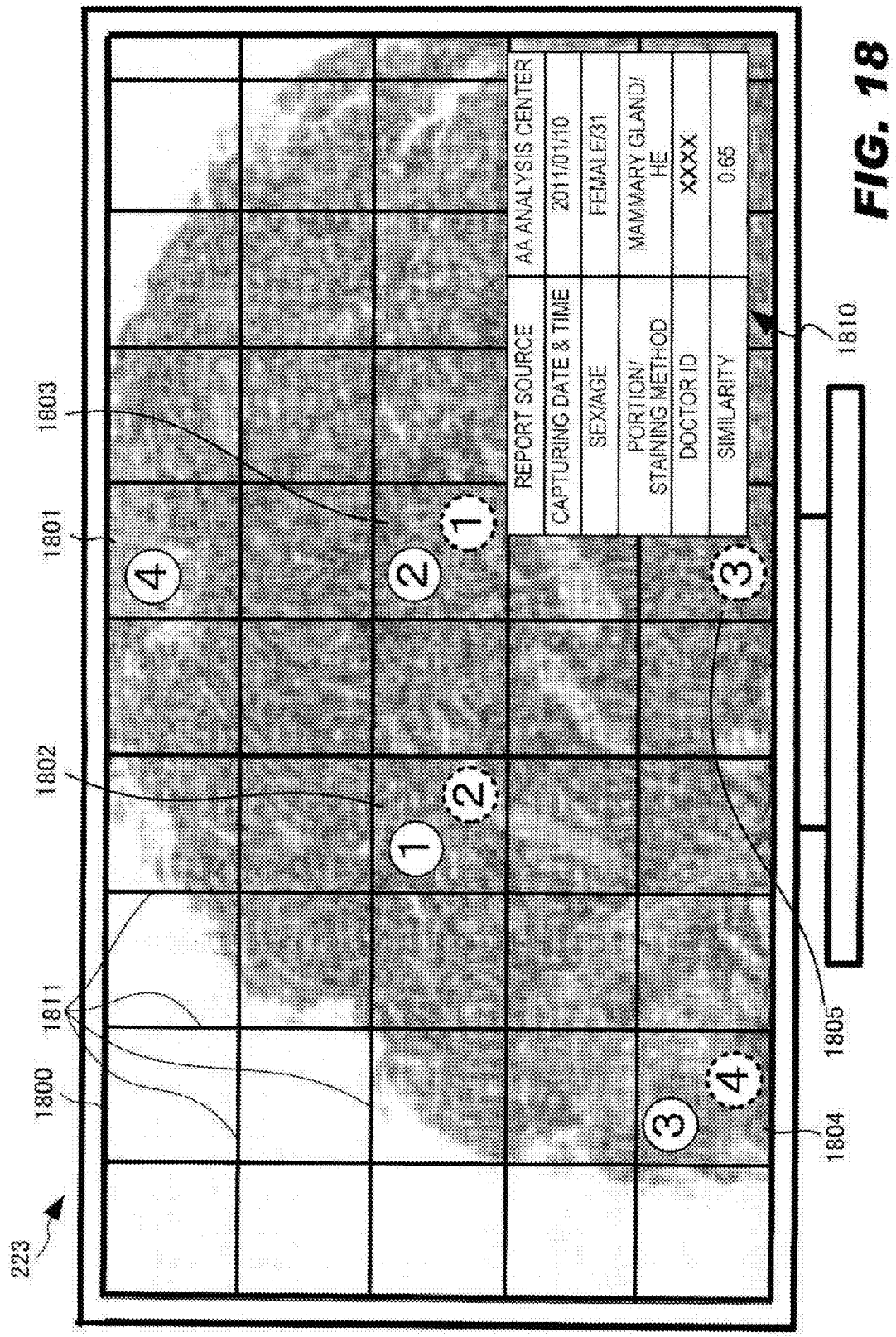
FIG. 18 is a view showing an analysis result display screen on the pathologist terminal according to the fourth embodiment of the present invention.

FIG. 18 is a view showing a display screen 1800 for analysis results and similarity on the display 223 of the pathologist terminal 220 according to the embodiment.

Grid lines 1811 similar to those in FIG. 17 are superimposed on the display screen 1800. In blocks 1801 to 1804 which are grids and correspond to the blocks 1701 to 1704 in FIG. 17, the priorities of these blocks serving as ROIs selected by the pathologist are displayed as circled numbers. Further, the priorities of ROIs selected by the analysis center or specialist are displayed as circled numbers of broken lines in 1803, 1802, 1805, and 1804. Information 1810 includes a doctor ID at a request destination or request source, and a calculated similarity.

<<Block Division and ROI-setting of Tissue Sample Image>>

Block division and ROI-setting of a tissue sample image are performed as follows.

First, a tissue area selected from a tissue sample image is divided into sub-regions (blocks). A typical method sets sub-regions by matrix block division. Even in this case, there is a method of excluding regions having no tissue from targets, and setting the remaining regions as target regions. Regions do not overlap each other in block division, but may overlap each other. For example, predetermined rectangular or circular regions each centered on a point where a tissue exists are set as overlapped sub-regions. In any case, ROI position information is fixed and known in advance, unlike the second and third embodiments.

Then, the pathologist selects important blocks to be analyzed and sets them as ROIs. When automatically selecting blocks by an apparatus, this is performed using an ROI selection criterion. The ROI selection criterion is created based on general pathological knowledge such as the density of cell nuclei and the shape of a cluster of cell nuclei, and artificial intelligence information created by a machine learning algorithm. All blocks need not be ordered, and it is also possible to give ranks to only a predetermined number of high-order blocks, and give the lowest rank to the remaining blocks. For example, in FIG. 17, blocks other than those having priorities "1" to "4" are set to have priority "5."

<<Rank Correlation Value Calculation>>

As a method of calculating a rank correlation coefficient in similarity calculation used in the embodiment, the Spearman's rank correlation coefficient and Kendall's rank correlation coefficient will be explained.

(Spearman's Rank Correlation Coefficient)

The Spearman's rank correlation coefficient $R_s$ is defined by $$R_s = 1 - \frac{6\sum_{n=1}^{N} d_n^2}{N^3 - N} \quad \text{[Mathematical 3]}$$

where N is the total number of classifications (all blocks: target regions), and $d_n$ is the rank difference in a corresponding classification. $R_s$ takes a numerical value of "−1" to "+1". $R_s$ exhibits a high positive correlation (correlation in the same order) when it is close to "+1", a high negative correlation (correlation when one order is reversed) when it is close to "−1", and no correlation when it is almost "0".

As described above, in the Spearman's rank correlation coefficient $R_s$, the rank difference $d_n$ contains a normalized distance between blocks upon setting blocks.

(Kendall's Rank Correlation Coefficient)

The Kendall's rank correlation coefficient $R_k$ is defined by $$R_k = \frac{\sum_{i=1}^{N} F_i - \sum_{i=1}^{N} B_i}{N(N-1)/2} \quad \text{[Mathematical 4]}$$

where N is the total number of classifications (all blocks: target regions), and $F_i$ is the number of Y, which satisfy $Y_i < Y_j$ among $Y_j$ (i=1, 2, ..., N−1/j=i+1, i+2, ..., N) in series 2 $\{Y_i\}$ when ranks in series 1 $\{X_i\}$ are rearranged in ascending order. $B_i$ is the number of $Y_i$ which satisfy $Y_i > Y_j$. Also, $\Sigma F_i$ is the count at which the directions of two variables in the original orders coincide with each other, and $\Sigma B_i$ is the count at which the directions of two variables coincide with each other when the order of one of the two variables is reversed. $R_k$ takes a numerical value of "−1" to "+1". $R_k$ exhibits a high positive correlation (correlation in the same order) when it is close to "+1", and takes "+1" when the directions of two variables completely coincide with each other. $R_k$ exhibits a high negative correlation (correlation when one order is reversed) when it is close to "−1", and no correlation when it is almost "0", and takes "−1" when the reverse orders completely coincide with each other.

As described above, even in the Kendall's rank correlation coefficient $R_k$, the coincidence between ranks contains a normalized distance between blocks upon setting blocks. Both the Spearman's rank correlation coefficient $R_s$ and Kendall's rank correlation coefficient $R_k$ permit the same rank, so the same rank may exist in the ROI selection list. For this reason, all blocks need not be ordered in block division, and the number of ranks can be set to be equal to or smaller than the number of blocks. For example, as described above, it is also possible to give ranks to only a predetermined number of high-order blocks, and give the lowest rank to the remaining blocks. Further, it suffices for similarity calculation to obtain rank correlation coefficients for the number of blocks including the predetermined number of selected high-order blocks. This can greatly shorten the calculation time.

[Fifth Embodiment]

The second to fourth embodiments have described an example in which a pathologist is notified of a similarity or a similarity is accumulated in the similarity accumulation DB. In the fifth embodiment, the trend of an ROI-setting by a pathologist, specialist, or apparatus is evaluated from similarities accumulated in the similarity accumulation DB, and the evaluation result is notified. According to the fifth embodiment, the trend of a doctor or apparatus is recognized and can be applied to education, learning, or selection of doctors (for example, selecting doctors with different trends) when a plurality of doctors are involved in diagnosis.

<<Arrangement of Information Processing System Including Information Processing Apparatus According to Fifth Embodiment>>

Figure 19:
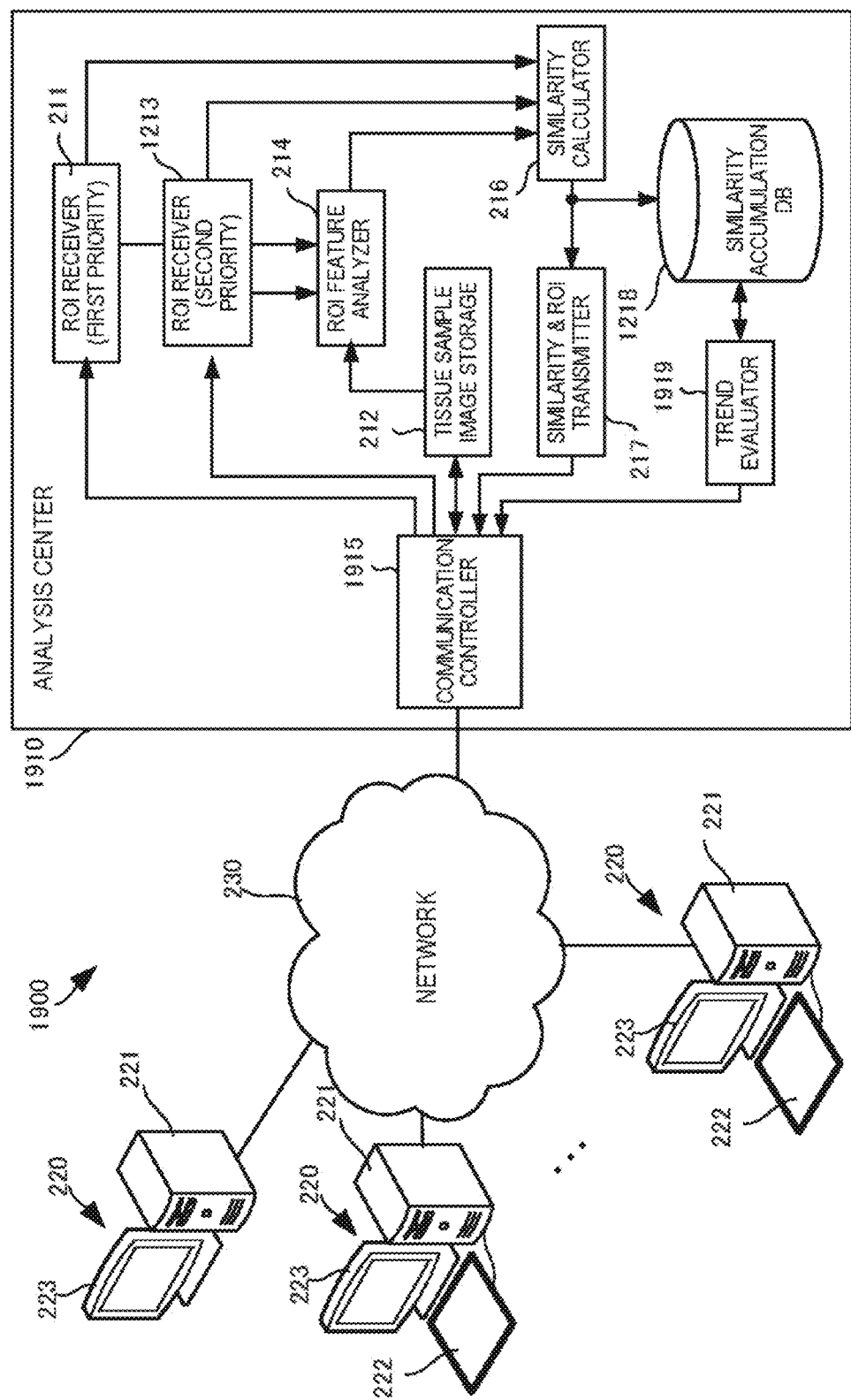
FIG. 19 is a block diagram showing the arrangement of an information processing system including an information processing apparatus according to the fifth embodiment of the present invention.

FIG. 19 is a block diagram showing the arrangement of an information processing system 1900 including an analysis center 1910 serving as an information processing apparatus according to the embodiment.

The arrangement in FIG. 19 is different from that in FIG. 12 in a trend evaluator 1919 which evaluates the ROI-setting trend of a doctor or apparatus by using similarities accumulated in a similarity accumulation DB 1218, and a communication controller 1915 which notifies a pathologist terminal 220 or specialist terminal 1220 of the trend evaluated by the trend evaluator 1919. The same reference numerals as those in FIG. 12 denote the same functional building components, and a description thereof will not be repeated.

<<Operation Procedure of Analysis Center>>

Figure 20:
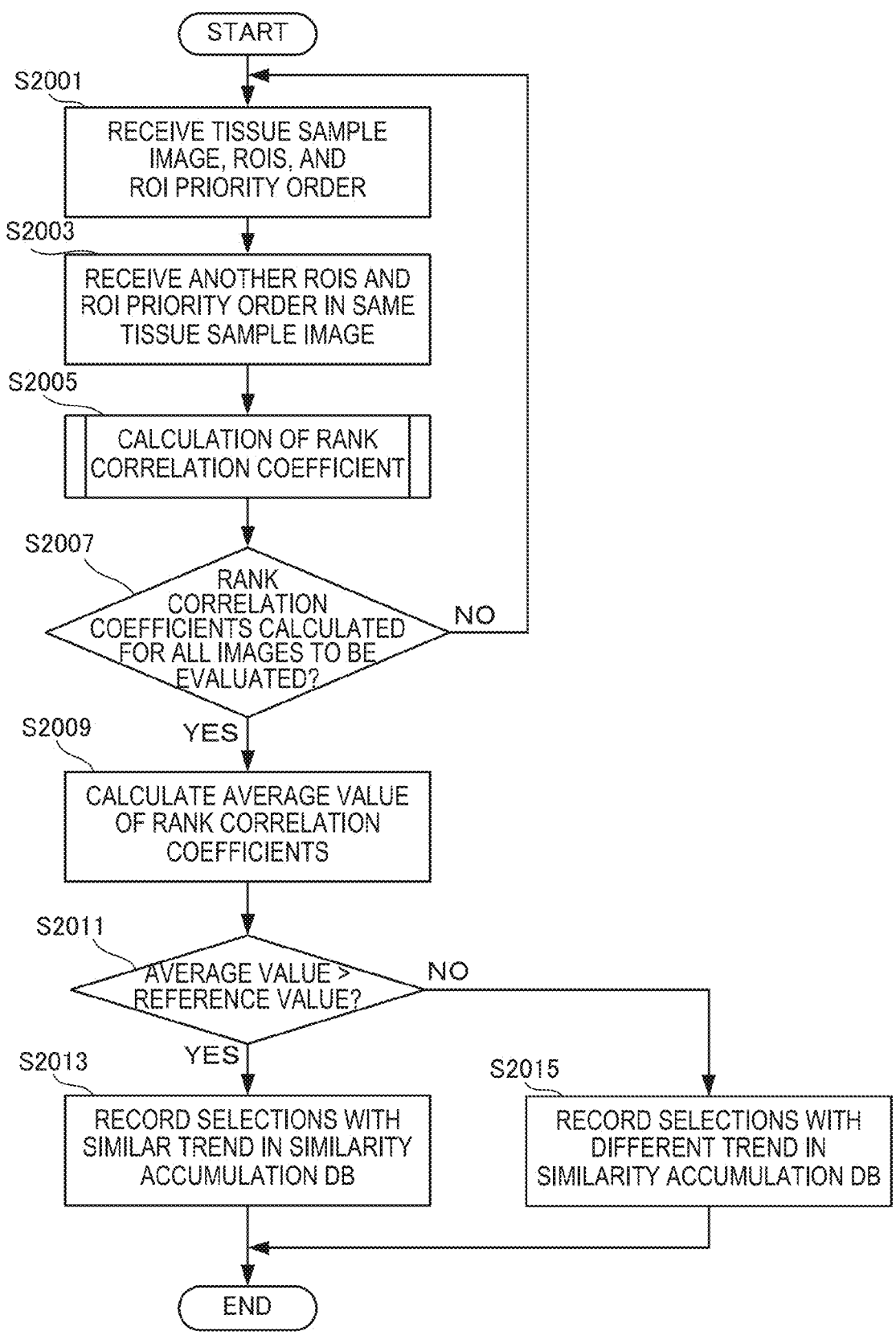
FIG. 20 is a flowchart showing the processing procedure of the information processing apparatus according to the fifth embodiment of the present invention.

FIG. 20 is a flowchart showing the processing procedure of the analysis center 1910 serving as the information processing apparatus according to the embodiment. A CPU executes this flowchart by using a RAM, thereby implementing the functional building components of the analysis center 1910 in FIG. 19.

First, in step S2001, the analysis center 1910 receives a tissue sample image, one ROI-setting, and the priority order of the ROIs. Then, in step S2003, the analysis center 1910 receives another ROI-setting and the priority order of the ROIs based on the same tissue sample image. Note that these two settings may be made by doctors, a doctor and apparatus, or apparatuses. In step S2005, the analysis center 1910 calculates a rank correlation coefficient. This calculation may use any of [Mathematical 1] to [Mathematical 4]. When [Mathematical 1] is used in block division, the center positions of ROIs are assumed to have been determined in advance. In step S2007, the analysis center 1910 determines whether rank correlation coefficients have been calculated for all images to be evaluated. Note that all images to be evaluated may be a plurality of tissue areas from one pathological slide or different pathological slides of the same portion in the case of education or learning. Further, all images to be evaluated may be images input for a long term with the lapse of time. If rank correlation coefficients have not been calculated for all images to be evaluated, the process returns to step S2001 to repeat the processing.

If rank correlation coefficients have been calculated for all images to be evaluated, the process advances to step S2009, and the analysis center 1910 calculates the average value of the rank correlation coefficients. In step S2011, the analysis center 1910 compares the average value of the rank correlation coefficients with a predetermined reference value. If the average value of the rank correlation coefficients is larger than the predetermined reference value, the process advances to step S2013, and the analysis center 1910 determines that the two ROI-settings have similar trend, and accumulates them in the similarity accumulation DB 1218 in association with the comparison targets. If the average value of the rank correlation coefficients is equal to or smaller than the predetermined reference value, the process advances to step S2015, and the analysis center 1910 determines that the two ROI-settings have different trend, and accumulates them in the similarity accumulation DB 1218 in association with the comparison targets.

As a practical use method, for example, when one ROI selection is a highly reliable result by an experienced pathologist and the other ROI selection is a less reliable result by an intern, the fifth embodiment can be used for measurement of the level of proficiency of the intern or determination of whether to select ROIs again.

[Sixth Embodiment]

In the fifth embodiment, the trend of ROI-settings (similar trend/different trend) are evaluated and notified every time a rank correlation coefficient is calculated. In the sixth embodiment, the time history is collected, and a pathologist terminal 220 can refer to the trend as a diagnosis trend table. According to the sixth embodiment, when a pathologist requests diagnosis assistance based on a tissue sample image, he can select in advance a person of whom assistance is requested, and can receive more effective assistance.

<<Operation Sequence of Information Processing System>>

Figure 21:
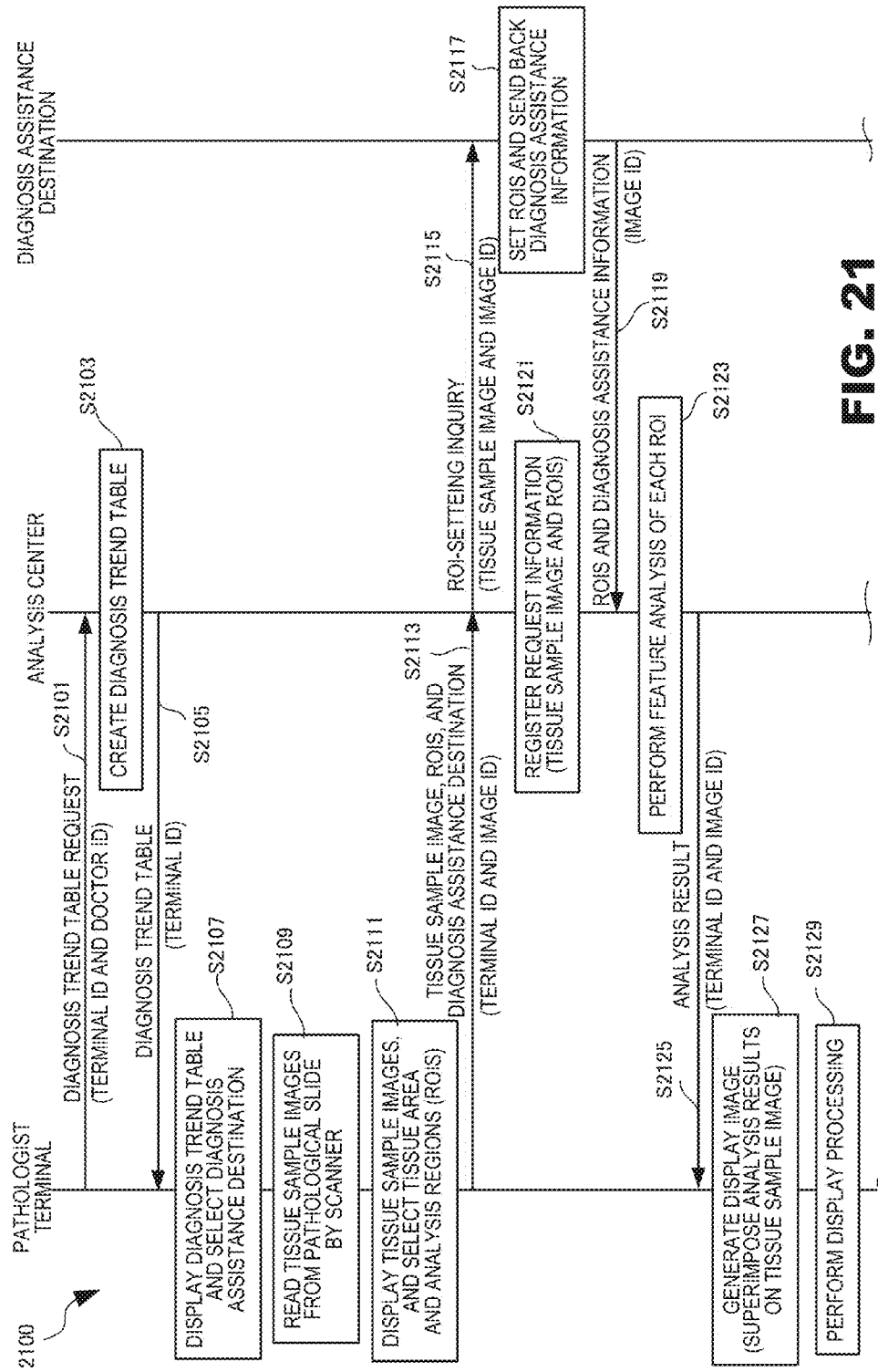
FIG. 21 is a sequence chart showing the operation procedure of an information processing system including an information processing apparatus according to the sixth embodiment of the present invention.

FIG. 21 is a sequence chart showing the operation procedure of an information processing system 2100 including an information processing apparatus according to the embodiment. The arrangement of the information processing system 2100 is the same as that in FIG. 19 according to the fifth embodiment.

First, in step S2101, the pathologist terminal 220 requests a diagnosis trend table of an analysis center 1910. In step S2103, the analysis center 1910 creates a diagnosis trend table by looking up a similarity accumulation DB 1218. In step S2105, the analysis center 1910 sends back the created diagnosis trend table to the pathologist terminal 220. In step S2107, the pathologist terminal 220 displays the received diagnosis trend table on a display 223, and a diagnosis assistance destination (or a plurality of diagnosis assistance destinations) is selected.

Subsequent processing is the same as the diagnosis assistance request sequence to a specialist terminal 1220 in FIG. 13 according to the third embodiment.

First, in step S2109, the pathologist terminal 220 reads a tissue sample image from a pathological slide by using a scanner 222. Then, in step S2111, a tissue area used for diagnosis is selected from a plurality of tissue areas in the tissue sample image. Further, ROIs, analysis of which is requested of the analysis center 1910 for diagnosis assistance, are selected from the selected tissue area. In step S2113, the pathologist terminal 220 transmits the tissue sample image, selected ROIs, and diagnosis assistance destination to the analysis center 1910.

In step S2113, the analysis center 1910 receives the tissue sample image and selected ROIs which have been transmitted from the pathologist terminal 220 to the analysis center 1910. In step S2115, the analysis center 1910 requests an ROI-setting of the specialist terminal 1220 serving as the diagnosis assistance destination. The tissue sample image, and an image ID for specifying the tissue sample image are added to the ROI-setting request. The specialist terminal 1220 serving as the diagnosis assistance destination displays the tissue sample image received from the analysis center 1910, sets ROIs and ROI priority order by the specialist in step S2117, and reports the setting result to the analysis center 1910 in step S2119.

The analysis center 1910 registers the request information (for example, the tissue sample image and ROIs) from the pathologist terminal 220 in step S2121, and waits for a report from the specialist terminal 1220 serving as the diagnosis assistance destination. If the analysis center 1910 receives the report of the ROIs and ROI priority order from the specialist terminal 1220, it analyzes the features of the respective ROIs in step S2123. In step S2125, the analysis center 1910 transmits the analysis results to the diagnosis assistance request source.

Upon receiving the analysis results in step S2125, the pathologist terminal 220 superimposes in step S2127 the analysis results and similarity on the tissue sample image read from the pathological slide in step S2109, and displays them on the display 223 in step S2129. The pathologist can diagnose the tissue sample image by referring to the analysis results displayed on the display 223 as assistance information, and evaluate and learn the ROI-setting by him based on the similarity.

(Inquiry Reply Display Screen)

Figure 22:
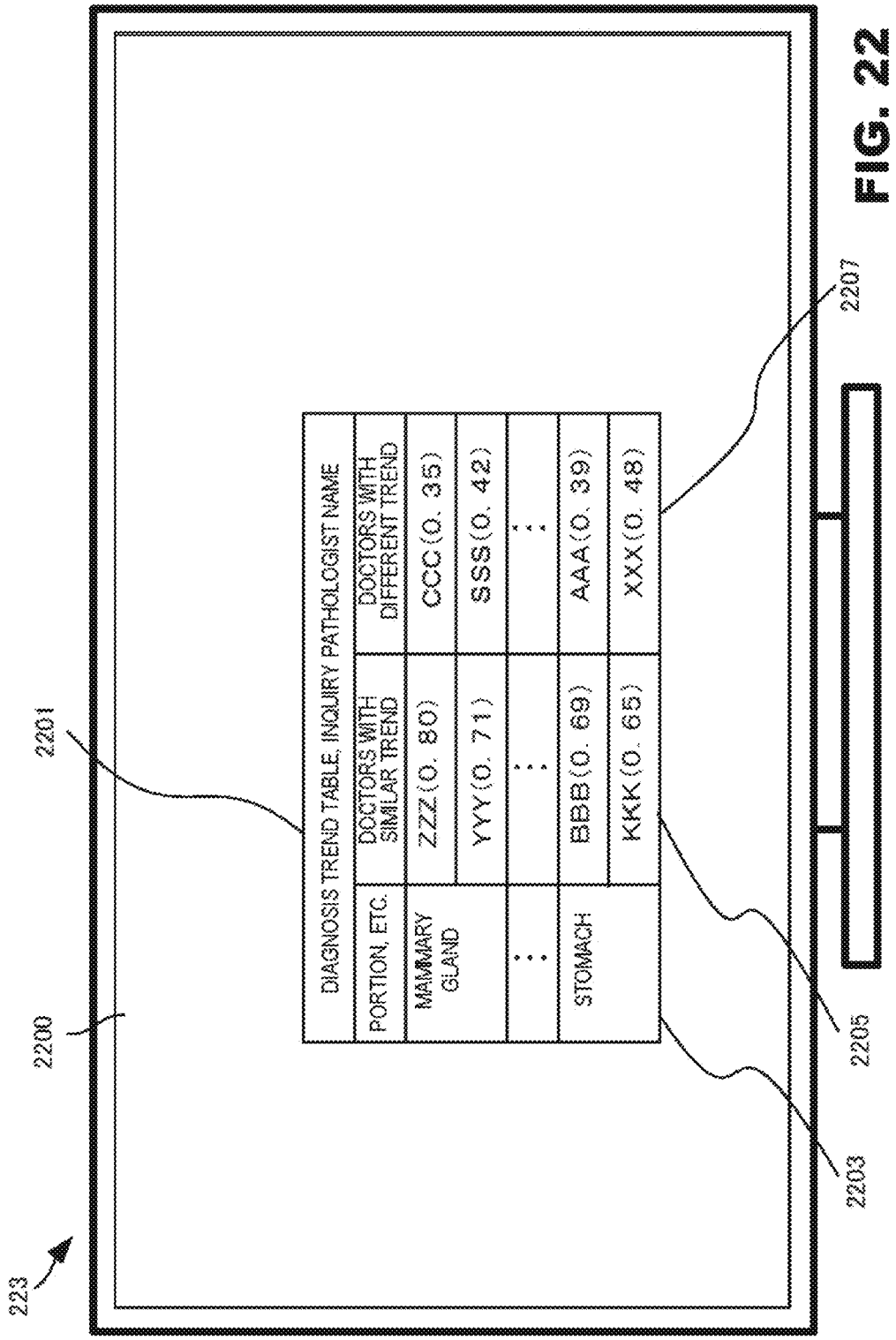
FIG. 22 is a view showing an inquiry reply display screen on a pathologist terminal according to the sixth embodiment of the present invention.

FIG. 22 is a view showing an inquiry reply display screen 2200 on the display 223 of the pathologist terminal 220 according to the embodiment.

Reference numeral 2201 denotes an entire diagnosis trend table. In the diagnosis trend table 2201, doctors 2205 with similar trend evaluated by the trend evaluator 1919 are arranged in descending order of the average value of rank correlation coefficients in correspondence with a portion 2203 of a tissue. Also, doctors 2207 with different trend are arranged in ascending order of the average value of rank correlation coefficients.

By displaying the diagnosis trend table 2201, a pathologist can select another pathologist from whom diagnosis assistance is received so that diagnosis becomes more accurate.

<<Operation Procedure of Analysis Center>>

Figure 23:
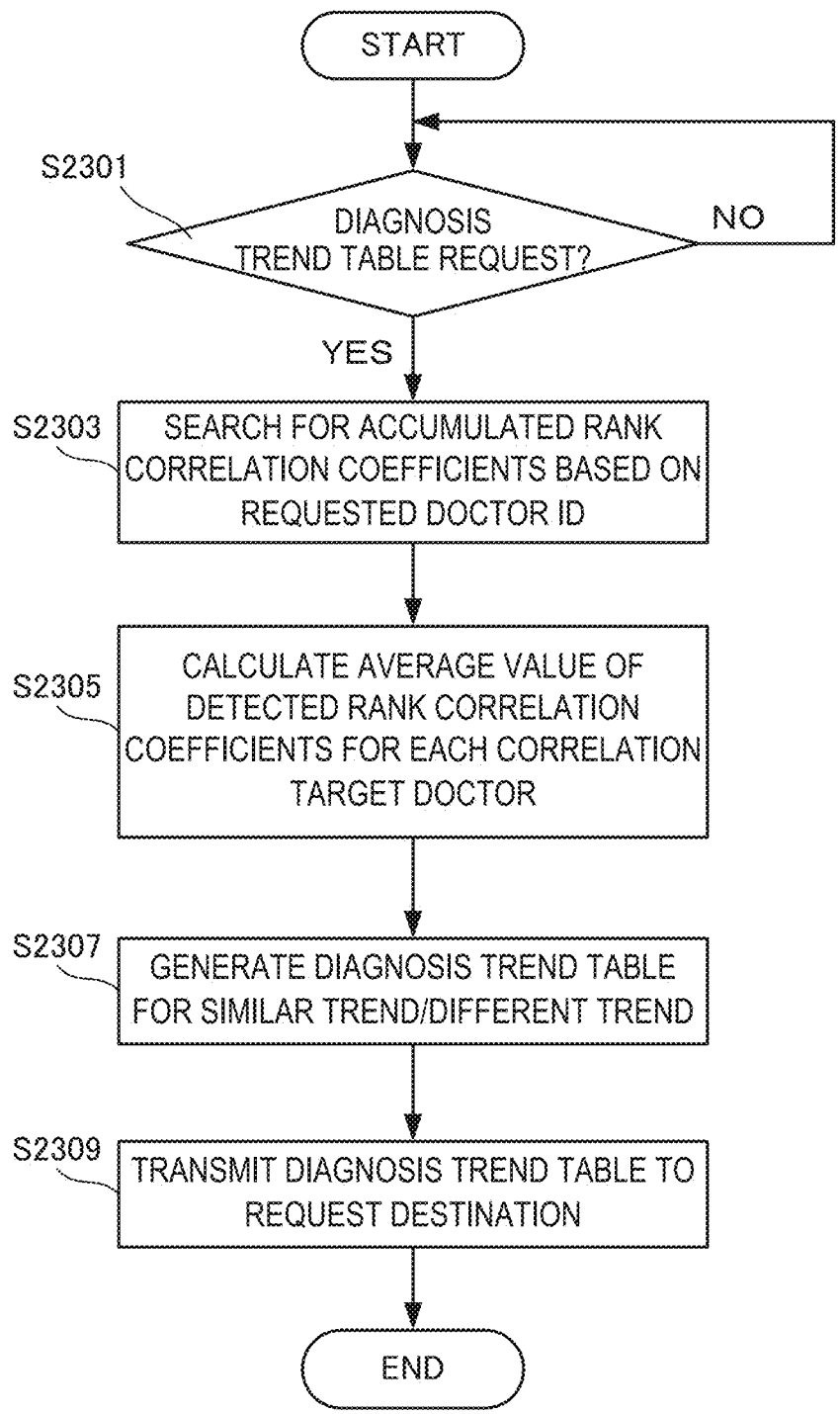
FIG. 23 is a flowchart showing the processing procedure of the information processing apparatus according to the sixth embodiment of the present invention.

FIG. 23 is a flowchart showing the processing procedure of the analysis center 1910 serving as the information processing apparatus according to the embodiment. A CPU executes this flowchart by using a RAM, thereby implementing the functional building components of the analysis center 1910 in FIG. 19.

First, in step S2301, the analysis center 1910 determines whether it has received a diagnosis trend table request from the pathologist terminal 220. If the analysis center 1910 has received a diagnosis trend table request from the pathologist terminal 220, the process advances to step S2303, and the analysis center 1910 searches for rank correlation coefficients accumulated in the similarity accumulation DB 1218 based on the requested doctor ID. In step S2305, the analysis center 1910 calculates the average value of the detected rank correlation coefficients for each correlation target doctor. In step S2307, the analysis center 1910 compares the calculated average value with a predetermined reference value. Similar to steps S2011 to S2015 in FIG. 20, the analysis center 1910 determines doctors with similar trend and doctors with different trend, and generates a diagnosis trend table. In step S2309, the analysis center 1910 transmits the generated diagnosis trend table to the pathologist terminal 220 serving as the request source.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can be applied to a system including plural devices or a single apparatus. The present invention can be applied to a case in which a control program for implementing the functions of the embodiments is supplied to the system or apparatus directly or from a remote site. Hence, the control program installed in a computer to implement the functions of the present invention by the computer, a medium storing the control program, or a WWW (World Wide Web) server to download the control program is also incorporated in the present invention.

This application claims the benefit of Japanese Patent Application No. 2011-018936 filed on Jan. 31, 2011, which is hereby incorporated by reference herein in its entirety.

The invention claimed is:

1. An information processing apparatus comprising:
    an input unit that inputs a plurality of first regions selected with first priority order as diagnosis targets from a tissue sample image obtained by capturing a tissue, a plurality of second regions selected with second priority order as diagnosis targets from the tissue sample image, and pieces of position information of the respective regions selected on the tissue sample image; and
    a calculator that calculates a similarity between the plurality of first regions with the first priority order and the plurality of second regions with the second priority order, based on correlations considering distances between the selected regions on the tissue sample image;
    wherein one or more of the input unit and the calculator are implemented via a CPU.

2. The information processing apparatus according to claim 1, wherein
    said input unit further inputs features analyzed from the plurality of first regions and the plurality of second regions, and
    said calculator calculates the similarity based on correlations weighted by the inputted features.

3. The information processing apparatus according to claim 2, wherein said calculator calculates the similarity by $R_1$ given by an equation:

$$R_l = \sum_{p=1}^{N} \frac{w_n(f_1, \ldots, f_M)(1 - d_n)}{N} \quad \text{[Mathematical 5]}$$

where N is the total number of classifications (target regions: ROIs), $d_n$ is a distance between centers of regions, and $w_n(f_1, \ldots, f_M)$ is a weighting coefficient which is determined by amounts of features $f_1$ to $f_M$ contained in two regions to be compared.

4. The information processing apparatus according to claim 3, wherein the weighting coefficient $w_n(f_1, \ldots, f_M)$ is given by an equation:

$$w_n(f) = \begin{cases} \min\begin{Bmatrix} f \in A_1, \\ f \in A_2 \end{Bmatrix} / f_0, & \min\begin{Bmatrix} f \in A_1, \\ f \in A_2 \end{Bmatrix} \leq f_0 \\ 1, & \min\begin{Bmatrix} f \in A_1, \\ f \in A_2 \end{Bmatrix} > f_0 \end{cases} \quad \text{[Mathematical 6]}$$

where f is one feature, $A_1$ is a region selected in first ROI selection for comparison, and $A_2$ is a region selected in second ROI selection, using, as a reference, a smaller amount out of features f contained in the regions, when the reference amount exceeds a predetermined value "$f_0$", $w_n$ is set to "1", and when the reference amount is not larger than "$f_0$", $w_n$ is set to a value obtained by dividing by "$f_0$" a smaller feature of a feature "$f_1$" of the region $A_1$ and a feature "$f_2$" of the region $A_2$.

5. An information processing method for assisting diagnosis based on a tissue sample image obtained by capturing a tissue, comprising:

inputting a plurality of first regions selected with first priority order as diagnosis targets from the tissue sample image, a plurality of second regions selected with second priority order as diagnosis targets from the tissue sample image, and pieces of position information of the respective regions selected on the tissue sample image;

calculating a similarity between the plurality of first regions with the first priority order and the plurality of second regions with the second priority order based on correlations considering distances between the selected regions on the tissue sample image; and displaying the similarity calculated in the calculating, and the plurality of first regions with the first priority order and the plurality of second regions with the second priority order which are represented to be distinguishable.

6. The information processing apparatus according to claim 1, wherein the plurality of first regions input by said input unit are selected from blocks obtained by dividing the tissue sample image with the first priority order, and the plurality of second regions are selected from the blocks obtained by dividing the tissue sample image with the second priority order, and said calculator calculates the similarity by a Spearman's rank correlation coefficient:

$$R_s = 1 - \frac{6\sum_{n=1}^{N} d_n^2}{N^3 - N} \quad \text{[Mathematical 7]}$$

where N is the total number of classifications (all blocks: target regions), and $d_n$ is a rank difference in a corresponding classification.

7. The information processing apparatus according to claim 1, wherein the plurality of first regions input by said input unit are selected from blocks obtained by dividing the tissue sample image with the first priority, and the plurality of second regions are selected from the blocks obtained by dividing the tissue sample image with the second priority order, and said calculator calculates the similarity by a Kendall's rank correlation coefficient:

$$R_k = \frac{\sum_{i=1}^{N} F_i - \sum_{i=1}^{N} B_i}{N(N-1)/2} \quad \text{[Mathematical 8]}$$

where N is the total number of classifications (all blocks: target regions), $F_i$, is the number of $Y_i$, which satisfy $Y_i < Y_j$ among $Y_i$, (i =1, 2, . . . , N-1/j=i+1, i+2, . . . , N) in series 2 $\{Y_i\}$ when ranks in series 1 $\{X_i\}$ are rearranged in ascending order, $B_i$ is the number of Y, which satisfy $Y_i > Y_j$, $\Sigma F_i$ is a count at which directions of two variables in original orders coincide with each other, and $\Sigma B_i$ is a count at which directions of two variables coincide with each other when an order of one of the two variables is reversed.

8. The information processing apparatus according to claim 1, wherein the plurality of first regions and the plurality of second regions are selected by a pathologist and a pathological image analysis apparatus, respectively, and the features are analyzed by the pathological image analysis apparatus from the plurality of first regions and the plurality of second regions.

9. The information processing apparatus according to claim 8, wherein the pathological image analysis apparatus is included in the information processing apparatus.

10. The information processing apparatus according to claim 1, further comprising a first transmitter that transmits the similarity calculated by said calculator and a plurality of regions serving as comparison targets of the similarity.

11. The information processing apparatus according to claim 1, further comprising:

an accumulator that accumulates similarities calculated by said calculator in association with a plurality of input sources to said input unit;

an evaluator that evaluates selection of a plurality of regions to be diagnosed in the plurality of input sources based on a history of the similarities accumulated in said accumulator; and a second transmitter that transmits evaluations for the selections in the plurality of input sources evaluated by said evaluator;

wherein one or more of the input unit and the calculator are implemented via a CPU.

12. The information processing apparatus according to claim 11, wherein said evaluator evaluates a trend of selection of a plurality of regions to be diagnosed in the input source based on an average value of a history of the similarities accumulated in said accumulator.

13. A method for controlling an information processing apparatus, comprising:
    inputting a plurality of first regions selected with first priority order as diagnosis targets from a tissue sample image obtained by capturing a tissue, a plurality of second regions selected with second priority order as diagnosis targets from the tissue sample image, and pieces of position information of the respective regions selected on the tissue sample image; and
    calculating a similarity between the plurality of first regions with the first priority order and the plurality of second regions with the second priority order, based on correlations considering distances between the selected regions on the tissue sample image.

14. A non-transitory computer-readable storage medium storing a control program for causing a computer to execute:
    inputting a plurality of first regions selected with first priority order as diagnosis targets from a tissue sample image obtained by capturing a tissue, a plurality of second regions selected with second priority order as diagnosis targets from the tissue sample image, and pieces of position information of the respective regions selected on the tissue sample image; and
    calculating a similarity between the plurality of first regions with the first priority order and the plurality of second regions with the second priority order, based on correlations considering distances between the selected regions on the tissue sample image.

15. An information processing apparatus comprising:
    a transmitter that transmits a plurality of first regions selected with first priority order as diagnosis targets from a tissue sample image obtained by capturing a tissue;
    a receiver that receives a plurality of second regions selected with second priority order as diagnosis targets from the tissue sample image, and a similarity between the plurality of first regions with the first priority order and the plurality of second regions with the second priority order, the similarity being calculated, in response to the transmission of the plurality of first regions, based on distances between the selected regions that are weighted by features of the regions on the tissue sample image; and
        a display that displays the similarity received by said receiver, and the plurality of first regions with the first priority order and the plurality of second regions with the second priority order which are represented to be distinguishable.

16. A method for controlling an information processing apparatus, comprising:
    transmitting a plurality of first regions selected as diagnosis targets from a tissue sample image obtained by capturing a tissue;
    receiving a plurality of second regions selected with second priority order as diagnosis targets from the tissue sample image, and a similarity between the plurality of first regions with the first priority order and the plurality of second regions with the second priority order, the similarity being calculated, in response to the transmission of the plurality of first regions, based on distances between the selected regions that are weighted by features of the regions on the tissue sample image; and
    displaying the similarity received in the receiving, and the plurality of first regions with the first priority order and the plurality of second regions with second priority order which are represented to be distinguishable.

17. A non-transitory computer-readable storage medium storing a control program for causing a computer to execute:
    transmitting a plurality of first regions selected with first priority order as diagnosis targets from a tissue sample image obtained by capturing a tissue;
    receiving a plurality of second regions selected with second priority order as diagnosis targets from the tissue sample image, and a similarity between the plurality of first regions with the first priority order and the plurality of second regions with the second priority order, the similarity being calculated, in response to the transmission of the plurality of first regions, based on distances between the selected regions that are weighted by features of the regions on the tissue sample image; and
    displaying the similarity received in the receiving, and the plurality of first regions with the first priority order and the plurality of second regions with the second priority order which are represented to be distinguishable.

18. An information processing system which assists diagnosis based on a tissue sample image obtained by capturing a tissue, comprising:
    an input unit that inputs a plurality of first regions selected with first priority order as diagnosis targets from the tissue sample image, a plurality of second regions selected with second priority order as diagnosis targets from the tissue sample image, and pieces of position information of the respective regions selected on the tissue sample image;
    a calculator that calculates a similarity between the plurality of first regions with the first priority order and the plurality of second regions with the second priority order, based on correlations considering distances between the selected regions on the tissue sample image; and
    a display that displays the similarity calculated by said calculator, and the plurality of first regions with the first priority order and the plurality of second regions with the second priority order which are represented to be distinguishable.

* * * * *

UNITED STATES PATENT AND TRADEMARK OFFICE
CERTIFICATE OF CORRECTION

PATENT NO. : 9,092,851 B2  
APPLICATION NO. : 13/982415  
DATED : July 28, 2015  
INVENTOR(S) : Atsushi Marugame Page 1 of 1

It is certified that error appears in the above-identified patent and that said Letters Patent is hereby corrected as shown below:

In The Specification

Column 18, Line 63: Delete "Y," and insert -- $Y_i$ --

Column 18, Line 63: Delete "Y, <$Y_i$" and insert -- $Y_i$<$Y_j$ --

Column 18, Line 64: Delete "$Y_j$" and insert -- $Y_i$ --

In The Claims

Column 24, Line 31: In Claim 7, delete "$F_i$," and insert -- $F_i$ --

Column 24, Line 31: In Claim 7, delete "$Y_i$," and insert -- $Y_i$ --

Column 24, Line 32: In Claim 7, delete "$Y_i$, <$Y_j$" and insert -- $Y_i$<$Y_j$ --

Column 24, Line 32: In Claim 7, delete "$Y_i$," and insert -- $Y_i$ --

Column 24, Line 35: In Claim 7, delete "Y," and insert -- $Y_i$ --

Signed and Sealed this  
Ninth Day of February, 2016

Michelle K. Lee  
*Director of the United States Patent and Trademark Office*